(12) United States Patent
Kannan

(10) Patent No.: US 11,740,857 B2
(45) Date of Patent: *Aug. 29, 2023

(54) PLAYBACK SESSION TRANSITIONS ACROSS DIFFERENT PLATFORMS

(71) Applicant: Sonos, Inc., Santa Barbara, CA (US)

(72) Inventor: Dinesh Kannan, Seattle, WA (US)

(73) Assignee: Sonos, Inc., Santa Barbara, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/524,579

(22) Filed: Nov. 11, 2021

(65) Prior Publication Data
US 2022/0244905 A1 Aug. 4, 2022

Related U.S. Application Data

(63) Continuation of application No. 16/745,910, filed on Jan. 17, 2020, now Pat. No. 11,175,883.

(51) Int. Cl.
| | | |
|---|---|---|
| G06F 3/16 | (2006.01) | |
| H04L 65/60 | (2022.01) | |
| G10L 25/51 | (2013.01) | |
| G05B 15/02 | (2006.01) | |
| H04W 84/12 | (2009.01) | |

(52) U.S. Cl.
CPC .............. *G06F 3/165* (2013.01); *G05B 15/02* (2013.01); *G06F 3/162* (2013.01); *G10L 25/51* (2013.01); *H04L 65/60* (2013.01); *H04W 84/12* (2013.01)

(58) Field of Classification Search
CPC ..... H04L 65/762; H04L 25/51; H04L 65/612; H04L 65/60; H04L 65/1073; G06F 3/165; G06F 3/162; H04M 65/60

USPC .......................................................... 700/94
See application file for complete search history.

(56) References Cited

U.S. PATENT DOCUMENTS

| | | | |
|---|---|---|---|
| 5,440,644 | A | 8/1995 | Farinelli et al. |
| 5,761,320 | A | 6/1998 | Farinelli et al. |
| 5,923,902 | A | 7/1999 | Inagaki |
| 6,032,202 | A | 2/2000 | Lea et al. |
| 6,256,554 | B1 | 7/2001 | DiLorenzo |

(Continued)

FOREIGN PATENT DOCUMENTS

| | | |
|---|---|---|
| EP | 1389853 A1 | 2/2004 |
| WO | 200153994 | 7/2001 |
| WO | 2003093950 A2 | 11/2003 |

OTHER PUBLICATIONS

AudioTron Quick Start Guide, Version 1.0, Mar. 2001, 24 pages.

(Continued)

*Primary Examiner* — Melur Ramakrishnaiah
(74) *Attorney, Agent, or Firm* — Fortem IP LLP; Benjamin Urban

(57) ABSTRACT

As noted above, example techniques relate to playback transitions between platforms. In an example implementation, while a first playback device is playing back audio content during a first playback session in a first domain, a mobile device detecting a first event configured as a trigger to transfer playback to a second domain on a second playback device. In response to detecting the first event, the mobile device determining playback information for the playback session and sends, via a network interface, instructions to initiate a playback session in the second domain to reproduce the first playback session in the first domain.

20 Claims, 15 Drawing Sheets

(56) References Cited

U.S. PATENT DOCUMENTS

| | | |
|---|---|---|
| 6,404,811 B1 | 6/2002 | Cvetko et al. |
| 6,469,633 B1 | 10/2002 | Wachter |
| 6,522,886 B1 | 2/2003 | Youngs et al. |
| 6,611,537 B1 | 8/2003 | Edens et al. |
| 6,631,410 B1 | 10/2003 | Kowalski et al. |
| 6,757,517 B2 | 6/2004 | Chang |
| 6,778,869 B2 | 8/2004 | Champion |
| 7,130,608 B2 | 10/2006 | Hollstrom et al. |
| 7,130,616 B2 | 10/2006 | Janik |
| 7,143,939 B2 | 12/2006 | Henzerling |
| 7,236,773 B2 | 6/2007 | Thomas |
| 7,295,548 B2 | 11/2007 | Blank et al. |
| 7,391,791 B2 | 6/2008 | Balassanian et al. |
| 7,483,538 B2 | 1/2009 | McCarty et al. |
| 7,571,014 B1 | 8/2009 | Lambourne et al. |
| 7,630,501 B2 | 12/2009 | Blank et al. |
| 7,643,894 B2 | 1/2010 | Braithwaite et al. |
| 7,657,910 B1 | 2/2010 | McAulay et al. |
| 7,853,341 B2 | 12/2010 | McCarty et al. |
| 7,987,294 B2 | 7/2011 | Bryce et al. |
| 8,014,423 B2 | 9/2011 | Thaler et al. |
| 8,045,952 B2 | 10/2011 | Qureshey et al. |
| 8,103,009 B2 | 1/2012 | McCarty et al. |
| 8,234,395 B2 | 7/2012 | Millington |
| 8,483,853 B1 | 7/2013 | Lambourne |
| 8,942,252 B2 | 1/2015 | Balassanian et al. |
| 2001/0042107 A1 | 11/2001 | Palm |
| 2002/0022453 A1 | 2/2002 | Balog et al. |
| 2002/0026442 A1 | 2/2002 | Lipscomb et al. |
| 2002/0124097 A1 | 9/2002 | Isely et al. |
| 2003/0157951 A1 | 8/2003 | Hasty, Jr. |
| 2004/0024478 A1 | 2/2004 | Hans et al. |
| 2007/0142944 A1 | 6/2007 | Goldberg et al. |
| 2010/0205642 A1* | 8/2010 | Foti .................... H04N 21/2181 725/109 |
| 2011/0131332 A1 | 6/2011 | Bouazizi |
| 2012/0029672 A1 | 2/2012 | Hamilton et al. |
| 2013/0051755 A1 | 2/2013 | Brown et al. |
| 2014/0068014 A1 | 3/2014 | Vonog et al. |
| 2015/0304712 A1 | 10/2015 | Liu |
| 2015/0350590 A1* | 12/2015 | Micewicz ........ H04N 21/42201 386/230 |
| 2017/0324790 A1* | 11/2017 | Li ......................... H04L 65/612 |
| 2018/0335903 A1* | 11/2018 | Coffman ............. G06F 3/04847 |
| 2019/0320221 A1 | 10/2019 | Graham et al. |
| 2020/0050423 A1 | 2/2020 | Coburn, IV et al. |
| 2020/0236152 A1* | 7/2020 | Bradley ........... H04N 21/44227 |
| 2021/0092176 A1* | 3/2021 | Schneider .......... H04N 21/4333 |

OTHER PUBLICATIONS

AudioTron Reference Manual, Version 3.0, May 2002, 70 pages.
AudioTron Setup Guide, Version 3.0, May 2002, 38 pages.
Bluetooth. "Specification of the Bluetooth System: The ad hoc Scatternet for affordable and highly functional wireless connectivity," Core, Version 1.0 A, Jul. 26, 1999, 1068 pages.
Bluetooth. "Specification of the Bluetooth System: Wireless connections made easy," Core, Version 1.0 B, Dec. 1, 1999, 1076 pages.
Dell, Inc. "Dell Digital Audio Receiver: Reference Guide," Jun. 2000, 70 pages.
Dell, Inc. "Start Here," Jun. 2000, 2 pages.
"Denon 2003-2004 Product Catalog," Denon, 2003-2004, 44 pages.
Jo et al., "Synchronized One-to-many Media Streaming with Adaptive Playout Control," Proceedings of SPIE, 2002, pp. 71-82, vol. 4861.
Jones, Stephen, "Dell Digital Audio Receiver: Digital upgrade for your analog stereo," Analog Stereo, Jun. 24, 2000 http://www.reviewsonline.com/articles/961906864.htm retrieved Jun. 18, 2014, 2 pages.
Louderback, Jim, "Affordable Audio Receiver Furnishes Homes With MP3," TechTV Vault. Jun. 28, 2000 retrieved Jul. 10, 2014, 2 pages.
Non-Final Office Action dated Dec. 23, 2020, issued in connection with U.S. Appl. No. 16/745,910, filed Jan. 17, 2020, 16 pages.
Non-Final Office Action dated May 13, 2021, issued in connection with U.S. Appl. No. 16/745,910, filed on Jan. 17, 2020, 15 pages.
Notice of Allowance dated Sep. 8, 2021, issued in connection with U.S. Appl. No. 16/745,910, filed on Jan. 17, 2020, 5 pages.
Palm, Inc., "Handbook for the Palm VII Handheld," May 2000, 311 pages.
Presentations at WinHEC 2000, May 2000, 138 pages.
U.S. Appl. No. 60/490,768, filed Jul. 28, 2003, entitled "Method for synchronizing audio playback between multiple networked devices," 13 pages.
U.S. Appl. No. 60/825,407, filed Sep. 12, 2006, entitled "Controlling and manipulating groupings in a multi-zone music or media system," 82 pages.
UPnP; "Universal Plug and Play Device Architecture," Jun. 8, 2000; version 1.0; Microsoft Corporation; pp. 1-54.
Yamaha DME 64 Owner's Manual; copyright 2004, 80 pages.
Yamaha DME Designer 3.5 setup manual guide; copyright 2004, 16 pages.
Yamaha DME Designer 3.5 User Manual; Copyright 2004, 507 pages.

* cited by examiner

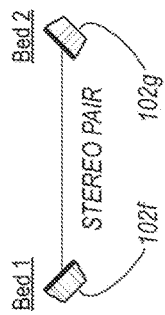
Fig. 3B
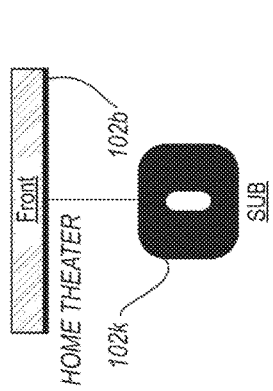
Fig. 3C
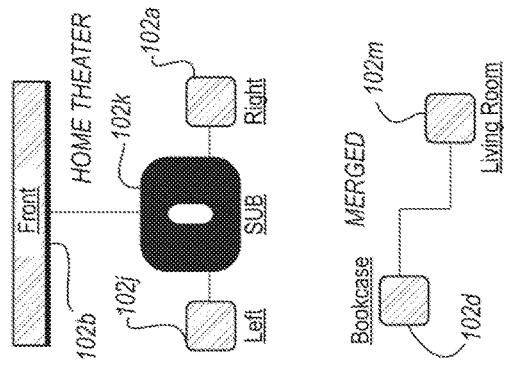
Fig. 3D
Fig. 3E
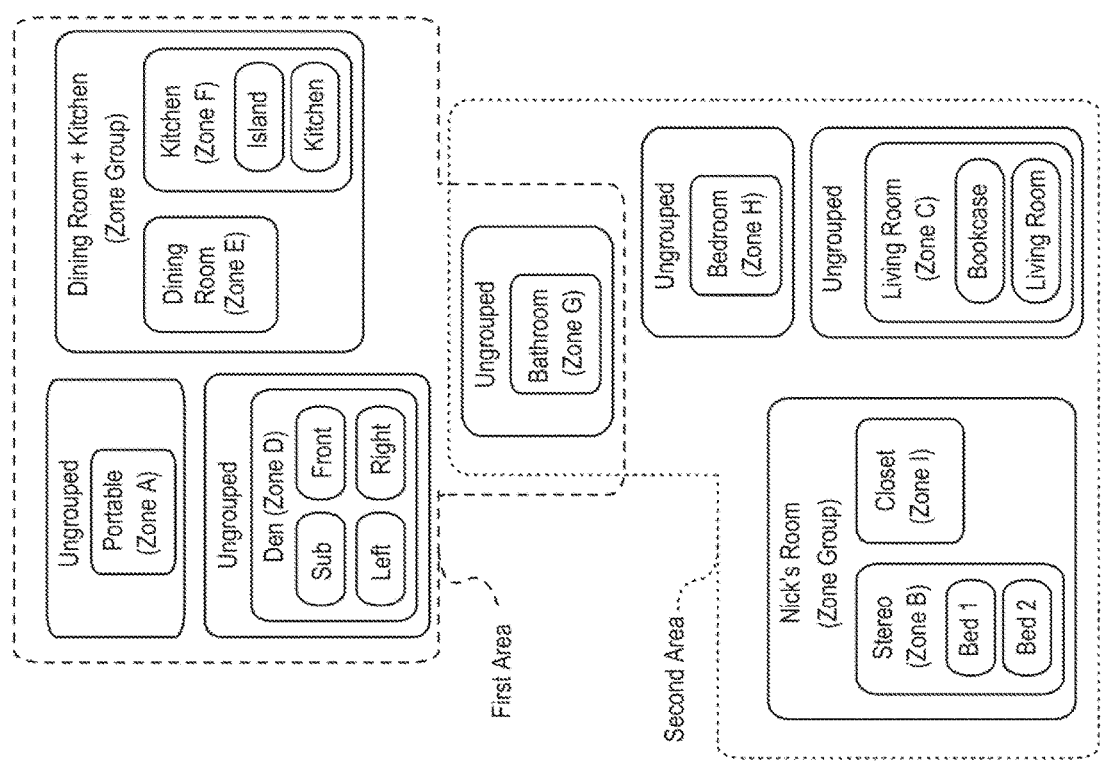
Fig. 3A

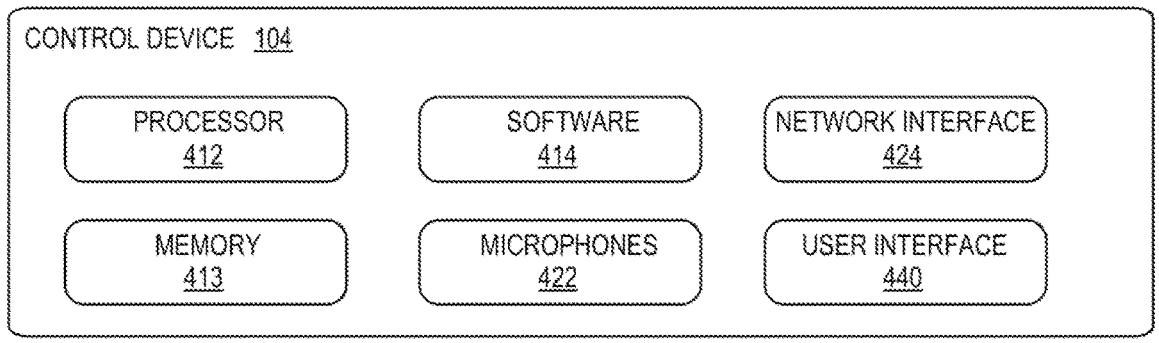
Fig. 4
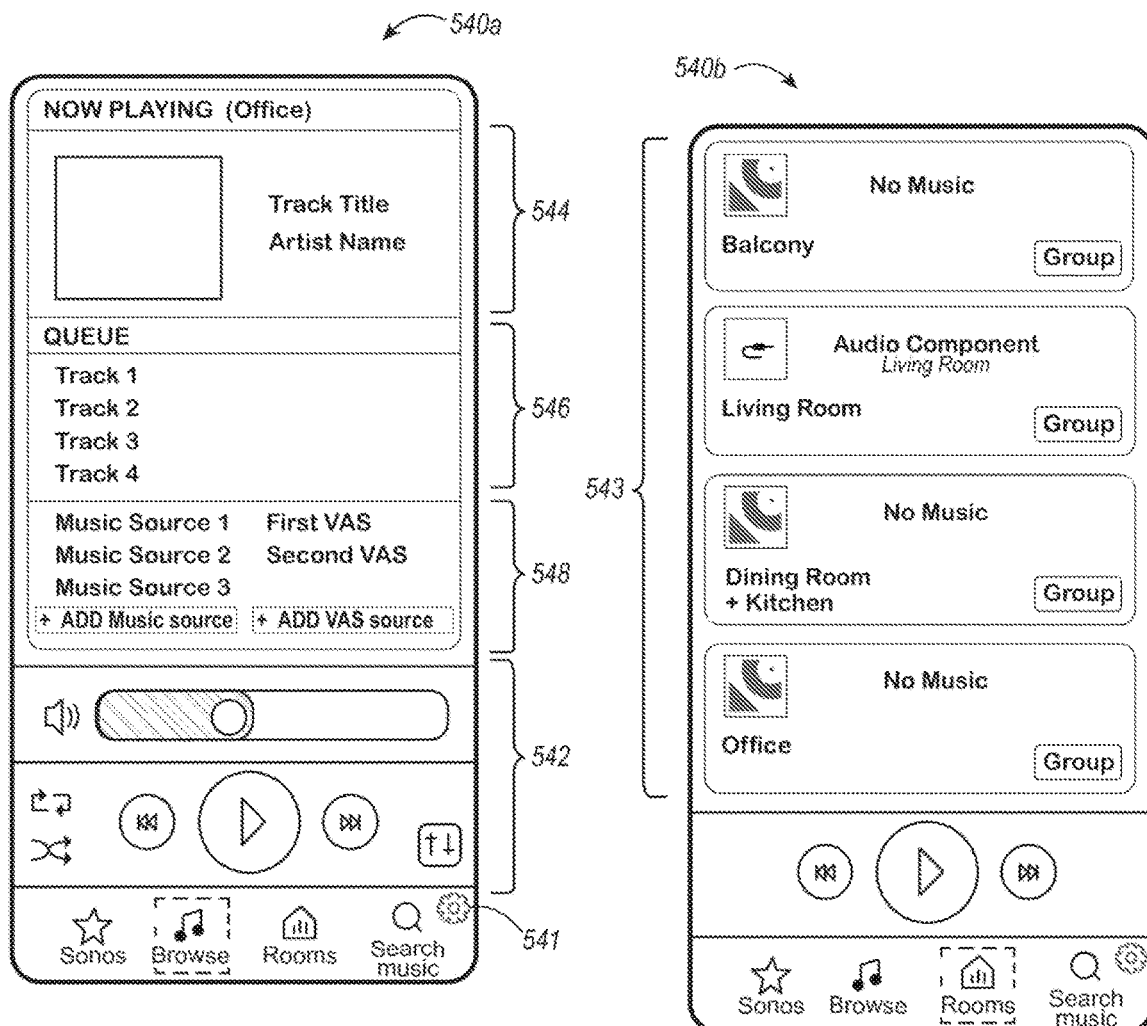
Fig. 5A
Fig. 5B

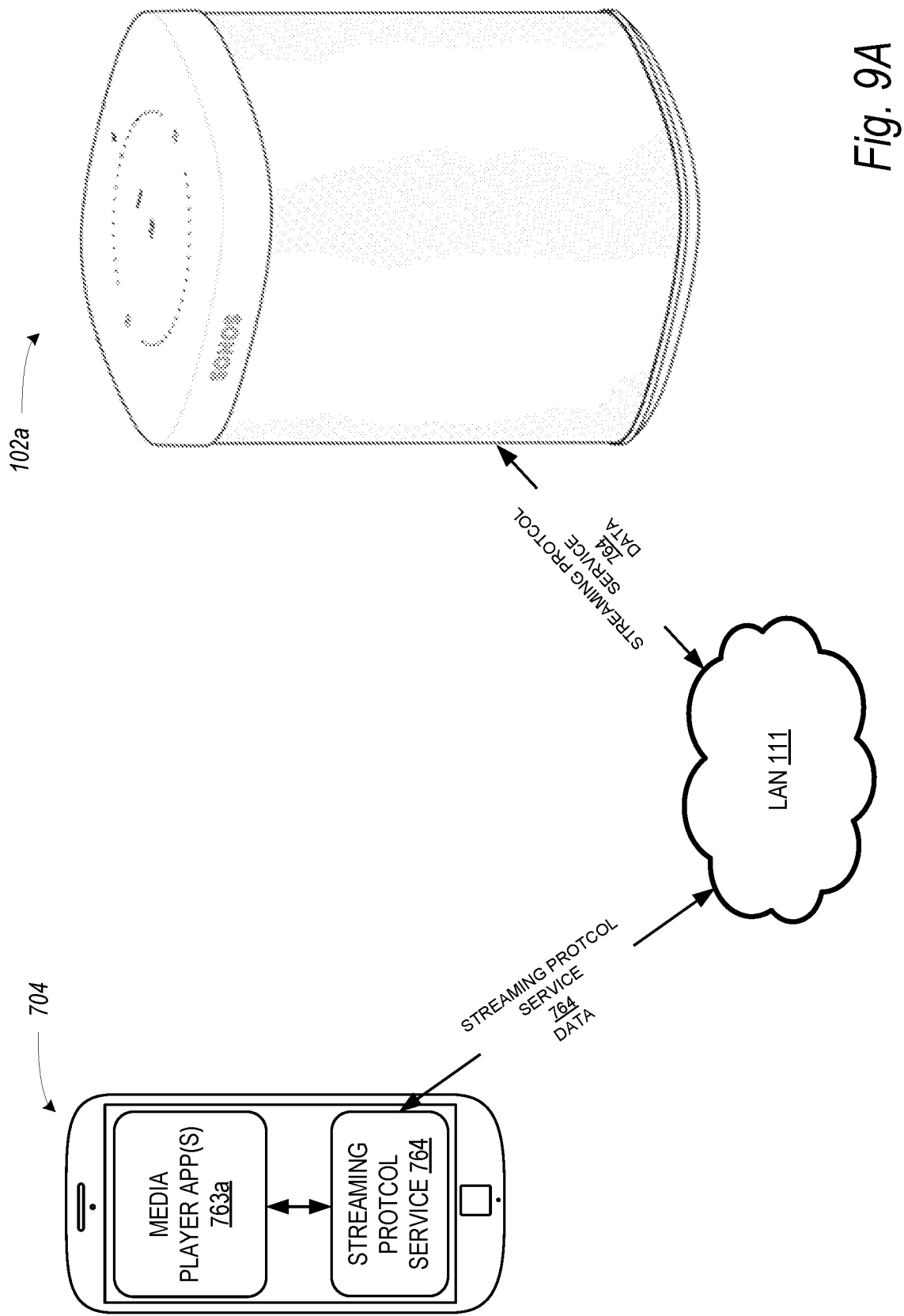

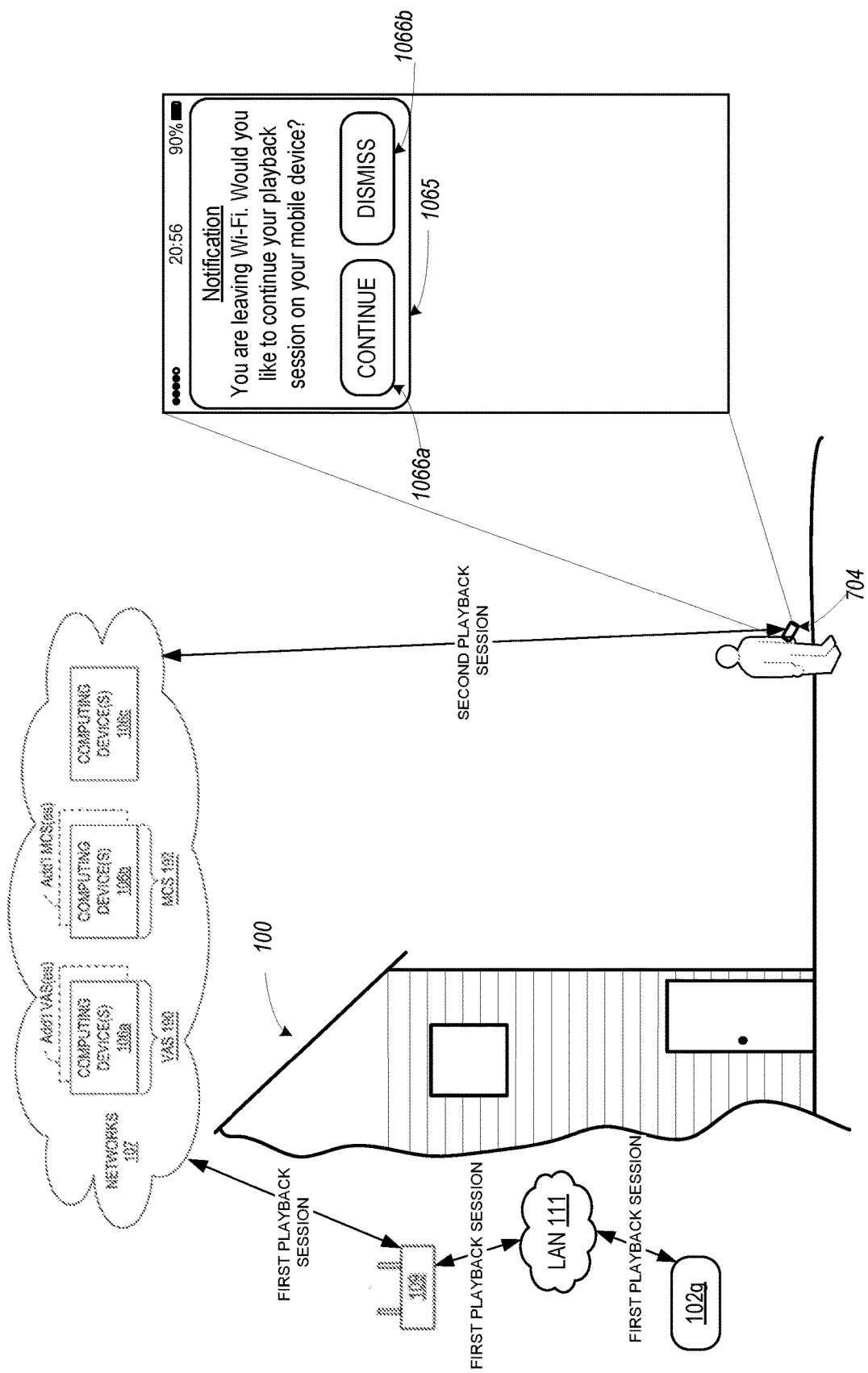

PLAYBACK SESSION TRANSITIONS ACROSS DIFFERENT PLATFORMS

CROSS REFERENCE TO RELATED APPLICATIONS

This application claims priority under 35 U.S.C. § 120 to, and is a continuation of, U.S. non-provisional patent application Ser. No. 16/745,910, filed on Jan. 17, 2020, and entitled "Playback Session Transitions Across Different Platforms," which is incorporated herein by reference in its entirety.

FIELD OF THE DISCLOSURE

The present technology relates to consumer goods and, more particularly, to methods, systems, products, features, services, and other elements directed to voice-assisted control of media playback systems or some aspect thereof.

BACKGROUND

Options for accessing and listening to digital audio in an out-loud setting were limited until in 2002, when SONOS, Inc. began development of a new type of playback system. Sonos then filed one of its first patent applications in 2003, entitled "Method for Synchronizing Audio Playback between Multiple Networked Devices," and began offering its first media playback systems for sale in 2005. The Sonos Wireless Home Sound System enables people to experience music from many sources via one or more networked playback devices. Through a software control application installed on a controller (e.g., smartphone, tablet, computer, voice input device), one can play what she wants in any room having a networked playback device. Media content (e.g., songs, podcasts, video sound) can be streamed to playback devices such that each room with a playback device can play back corresponding different media content. In addition, rooms can be grouped together for synchronous playback of the same media content, and/or the same media content can be heard in all rooms synchronously.

BRIEF DESCRIPTION OF THE DRAWINGS

Features, aspects, and advantages of the presently disclosed technology may be better understood with regard to the following description, appended claims, and accompanying drawings where:

Features, aspects, and advantages of the presently disclosed technology may be better understood with regard to the following description, appended claims, and accompanying drawings, as listed below. A person skilled in the relevant art will understand that the features shown in the drawings are for purposes of illustrations, and variations, including different and/or additional features and arrangements thereof, are possible.

FIGS. 3A, 3B, 3C, 3D and 3E are diagrams showing example playback device configurations in accordance with aspects of the disclosure.

FIG. 4 is a functional block diagram of an example controller device in accordance with aspects of the disclosure.

FIGS. 5A and 5B are controller interfaces in accordance with aspects of the disclosure.

FIG. 9A is a schematic diagram illustrating a streaming protocol service session, in accordance with aspects of the disclosure.

FIG. 10 is a schematic diagram illustrating an example playback session transition, in accordance with aspects of the disclosure.

Figure 1A:
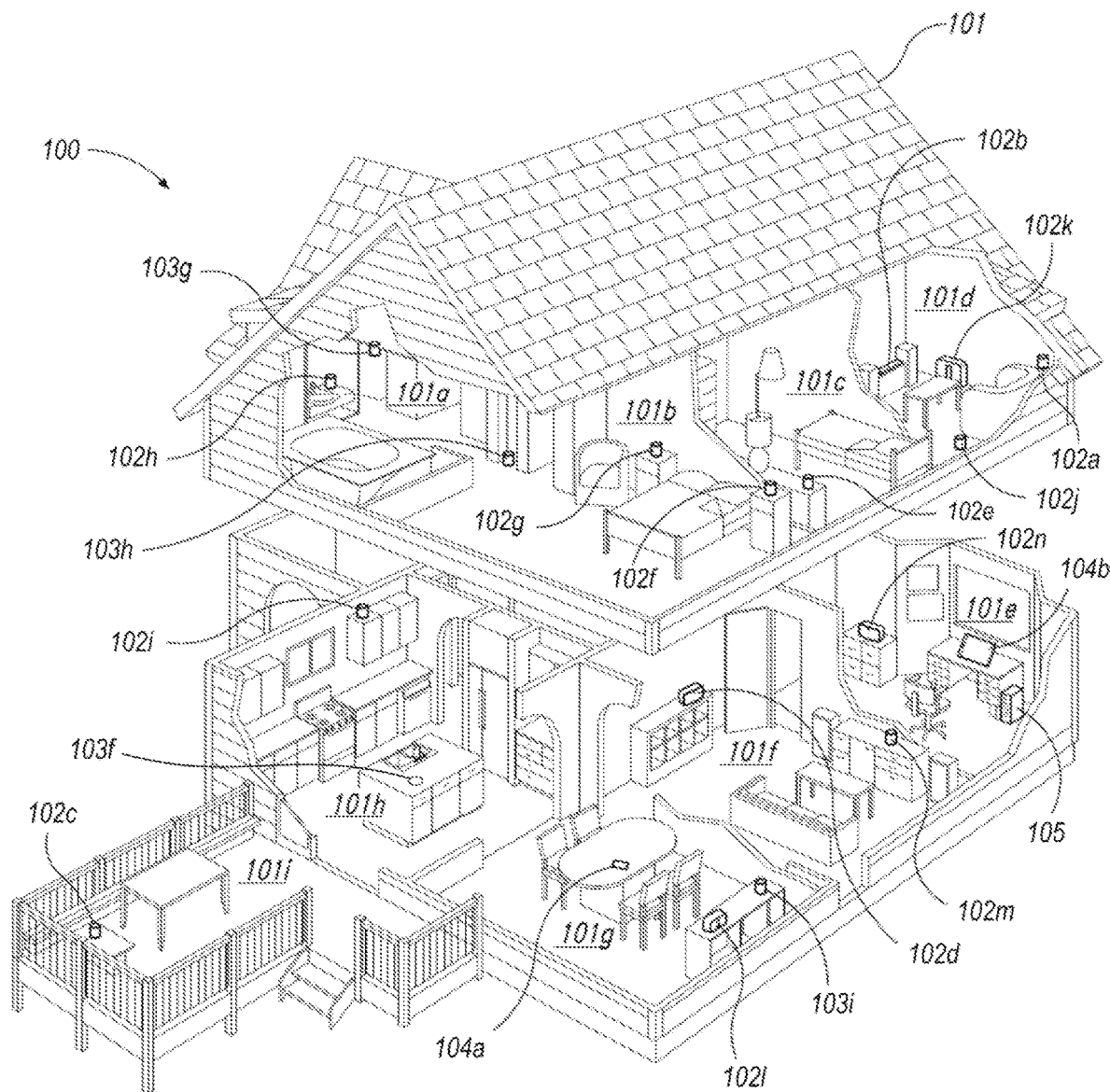
FIG. 1A is a partial cutaway view of an environment having a media playback system configured in accordance with aspects of the disclosed technology.

The drawings are for purposes of illustrating example embodiments, but it should be understood that the inventions are not limited to the arrangements and instrumentality shown in the drawings. In the drawings, identical reference numbers identify at least generally similar elements. To facilitate the discussion of any particular element, the most significant digit or digits of any reference number refers to the Figure in which that element is first introduced. For example, element 103a is first introduced and discussed with reference to FIG. 1A.

DETAILED DESCRIPTION

I. Overview

Example system and techniques described herein relate to transitioning a playback session between different platforms. Various entities, such as playback device manufacturers, mobile device manufacturers, and streaming audio services, may each establish respective platforms or "domains" for utilizing their products or services. To provider options to users for control, a wireless "smart" speaker, such as a SONOS playback device, may support playback control using multiple platforms. For instance, a user of a playback device may be able to control the playback device remotely using a native control application ("app") on their smartphone or computer, which utilizes a native protocol. The user may also be able to control their playback device using a protocol integrated into their mobile phone or computer (e.g., APPLE AIRPLAY). Further, the user may additionally be able to control the playback device using a streaming media service app utilizing a streaming media service protocol (e.g., via the SPOTIFY app using SPOTIFY CONNECT).

One benefit to these platforms is that they enable interoperability between devices that support the platform, such as the ability to transition a playback session between devices. For instance, a user may start a playback session on a first playback device (e.g., their mobile phone or a first "smart" speaker) in a first domain using a given app on their mobile device. After starting the playback session on the first playback device, the user may transition that playback session to a second playback device (e.g., a second "smart" speaker") by selecting the second playback device in the app. This allows the user to move the music or other audio content between rooms of their home (having respective "smart" speakers") or to move the music from and to their mobile device (e.g., when leaving their home). The protocol provided by the platform supports the control messaging necessary to enable such transitions.

One issue with these platforms is that they are not generally compatible with one another. Such incompatibility may be inherent as different platforms generally implement similar features in different ways, using different communications protocols and application programming interfaces (APIs). Yet, some users may benefit from interoperability between playback devices of different domains, including the ability to transition playback sessions between domains.

Since a playback device of the native domain is not natively compatible with a playback device of an extrinsic domain, a playback session is not inherently able to be transitioned from a first domain on a first playback device (e.g., a wireless smart speaker) to a second domain on a second playback device (e.g., a mobile device). As such, exemplary techniques to transition playback sessions may involve stopping a first playback session in a source domain on the first playback device and recreating the first session in a target domain as a second session on the second playback device. In this manner, the playback session may appear from the perspective of a user to have transitioned between the first and second playback devices and the source and target domains.

While, in some cases, a user may be able to manually stop a first playback session in a source domain on a first playback device and recreate the first session in the target domain as a second session on a second playback device, such a process is generally inconvenient. The user would have to make note of the currently playing audio track and play position in the source domain, and then find that audio track and play position in the target domain to start a playback session. If the user is playing a playlist in the source domain, recreating that playlist in the target domain may also be cumbersome.

Accordingly, example techniques described herein may involve automating one or more aspects of a playback session transition. For instance, the example techniques may involve querying, determining, or otherwise obtaining the current state of the first playback session in the source domain on the first playback device, which may include a currently playing audio track and play position within the audio track, as well as a playlist or queue that is currently being played back. The process for obtaining the current state of the first playback session in the first domain may vary based on the particular domain that is acting as the source, as different domains may make playback information available in different manners.

Further, the example techniques may further involve automating one or more aspects of a playback session transition by initiating the playback session transition based on a trigger condition. Various trigger conditions, such as a change in location (e.g., from at-home to on-the-go) or device proximity (a "tap" proximity contact between a mobile phone and wireless smart speaker) are indicative of conditions under which a user may desire to perform a playback session transition between platforms. Based on detecting one of these trigger conditions, a device may initiate the playback session transfer, perhaps after receiving input data confirming that the playback session should be transferred.

As noted above, example techniques described herein involve playback session transitions across different platforms. An example implementation includes: while a first playback device is playing back audio content during a first playback session in a first domain, detecting a first event, the first event configured as a trigger to transfer playback to a second domain on a second playback device; in response to detecting the first event, determining that the first playback device was playing particular audio content from a network location at one or more servers of a particular streaming audio service and that the first playback device was at a given playback position in the particular audio content; and sending, via a network interface, instructions to initiate a playback session in the second domain to play back the particular audio content on the second playback device, the instructions indicating the network location at the one or more servers of the particular streaming audio service and an offset in the particular audio content representing the given playback position.

While some examples described herein may refer to functions performed by given actors such as "users," "listeners," and/or other entities, it should be understood that this is for purposes of explanation only. The claims should not be interpreted to require action by any such example actor unless explicitly required by the language of the claims themselves.

Moreover, some functions are described herein as being performed "based on" or "in response to" another element or function. "Based on" should be understood that one element or function is related to another function or element. "In response to" should be understood that one element or function is a necessary result of another function or element. For the sake of brevity, functions are generally described as being based on another function when a functional link exists; however, such disclosure should be understood as disclosing either type of functional relationship.

In the FIGS., identical reference numbers identify generally similar, and/or identical, elements. To facilitate the discussion of any particular element, the most significant digit or digits of a reference number refers to the Figure in which that element is first introduced. For example, element 110a is first introduced and discussed with reference to FIG. 1A. Many of the details, dimensions, angles and other features shown in the Figures are merely illustrative of particular embodiments of the disclosed technology. Accordingly, other embodiments can have other details, dimensions, angles and features without departing from the spirit or scope of the disclosure. In addition, those of ordinary skill in the art will appreciate that further embodiments of the various disclosed technologies can be practiced without several of the details described below.

II. Example Operation Environment

Figure 1B:
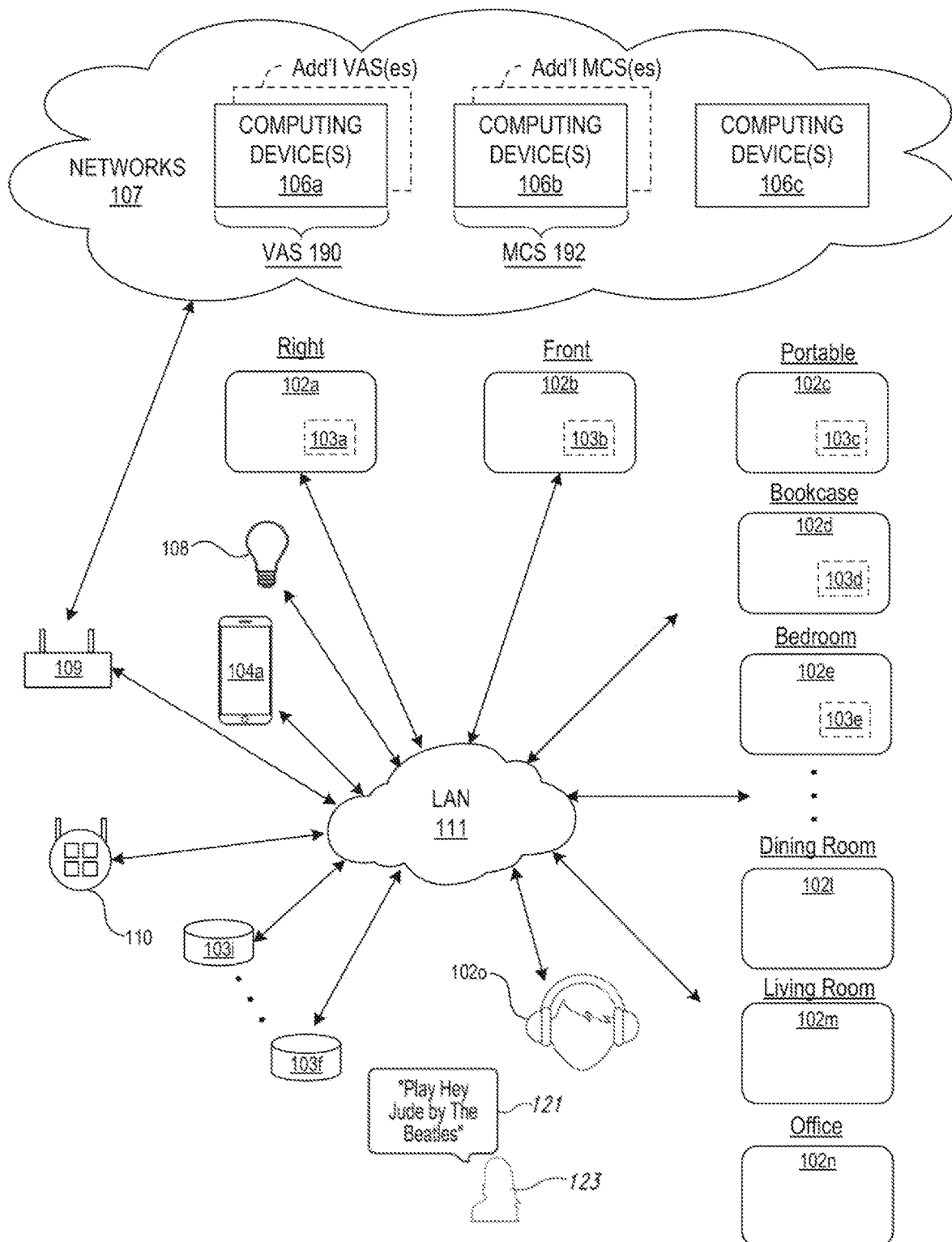
FIG. 1B is a schematic diagram of the media playback system of FIG. 1A and one or more networks.

FIGS. 1A and 1B illustrate an example configuration of a media playback system 100 (or "MPS 100") in which one or more embodiments disclosed herein may be implemented. Referring first to FIG. 1A, the MPS 100 as shown is associated with an example home environment having a plurality of rooms and spaces, which may be collectively referred to as a "home environment," "smart home," or "environment 101." The environment 101 comprises a household having several rooms, spaces, and/or playback zones, including a master bathroom 101a, a master bedroom 101b, (referred to herein as "Nick's Room"), a second bedroom 101c, a family room or den 101d, an office 101e, a living room 101f, a dining room 101g, a kitchen 101h, and an outdoor patio 101i. While certain embodiments and examples are described below in the context of a home environment, the technologies described herein may be implemented in other types of environments. In some embodiments, for example, the MPS 100 can be implemented in one or more commercial settings (e.g., a restaurant, mall, airport, hotel, a retail or other store), one or more vehicles (e.g., a sports utility vehicle, bus, car, a ship, a boat, an airplane), multiple environments (e.g., a combination of home and vehicle environments), and/or another suitable environment where multi-zone audio may be desirable.

Within these rooms and spaces, the MPS 100 includes one or more computing devices. Referring to FIGS. 1A and 1B together, such computing devices can include playback devices 102 (identified individually as playback devices 102a-102o), network microphone devices 103 (identified individually as "NMDs" 103a-102i), and controller devices 104a and 104b (collectively "controller devices 104"). Referring to FIG. 1B, the home environment may include additional and/or other computing devices, including local network devices, such as one or more smart illumination devices 108 (FIG. 1B), a smart thermostat 110, and a local computing device 105 (FIG. 1A). In embodiments described below, one or more of the various playback devices 102 may be configured as portable playback devices, while others may be configured as stationary playback devices. For example, the headphones 102o (FIG. 1B) are a portable playback device, while the playback device 102d on the bookcase may be a stationary device. As another example, the playback device 102c on the Patio may be a battery-powered device, which may allow it to be transported to various areas within the environment 101, and outside of the environment 101, when it is not plugged in to a wall outlet or the like.

With reference still to FIG. 1B, the various playback, network microphone, and controller devices 102, 103, and 104 and/or other network devices of the MPS 100 may be coupled to one another via point-to-point connections and/or over other connections, which may be wired and/or wireless, via a network 111, such as a LAN including a network router 109. For example, the playback device 102j in the Den 101d (FIG. 1A), which may be designated as the "Left" device, may have a point-to-point connection with the playback device 102a, which is also in the Den 101d and may be designated as the "Right" device. In a related embodiment, the Left playback device 102j may communicate with other network devices, such as the playback device 102b, which may be designated as the "Front" device, via a point-to-point connection and/or other connections via the NETWORK 111.

As further shown in FIG. 1B, the MPS 100 may be coupled to one or more remote computing devices 106 via a wide area network ("WAN") 107. In some embodiments, each remote computing device 106 may take the form of one or more cloud servers. The remote computing devices 106 may be configured to interact with computing devices in the environment 101 in various ways. For example, the remote computing devices 106 may be configured to facilitate streaming and/or controlling playback of media content, such as audio, in the home environment 101.

In some implementations, the various playback devices, NMDs, and/or controller devices 102-104 may be communicatively coupled to at least one remote computing device associated with a VAS and at least one remote computing device associated with a media content service ("MCS"). For instance, in the illustrated example of FIG. 1B, remote computing devices 106 are associated with a VAS 190 and remote computing devices 106b are associated with an MCS 192. Although only a single VAS 190 and a single MCS 192 are shown in the example of FIG. 1B for purposes of clarity, the MPS 100 may be coupled to multiple, different VASes and/or MCSes. In some implementations, VASes may be operated by one or more of AMAZON, GOOGLE, APPLE, MICROSOFT, SONOS or other voice assistant providers. In some implementations, MCSes may be operated by one or more of SPOTIFY, PANDORA, AMAZON MUSIC, or other media content services.

As further shown in FIG. 1B, the remote computing devices 106 further include remote computing device 106c configured to perform certain operations, such as remotely facilitating media playback functions, managing device and system status information, directing communications between the devices of the MPS 100 and one or multiple VASes and/or MCSes, among other operations. In one example, the remote computing devices 106c provide cloud servers for one or more SONOS Wireless HiFi Systems.

In various implementations, one or more of the playback devices 102 may take the form of or include an on-board (e.g., integrated) network microphone device. For example, the playback devices 102a-e include or are otherwise equipped with corresponding NMDs 103a-e, respectively. A playback device that includes or is equipped with an NMD may be referred to herein interchangeably as a playback device or an NMD unless indicated otherwise in the description. In some cases, one or more of the NMDs 103 may be a stand-alone device. For example, the NMDs 103f and 103g may be stand-alone devices. A stand-alone NMD may omit components and/or functionality that is typically included in a playback device, such as a speaker or related electronics. For instance, in such cases, a stand-alone NMD may not produce audio output or may produce limited audio output (e.g., relatively low-quality audio output).

The various playback and network microphone devices 102 and 103 of the MPS 100 may each be associated with a unique name, which may be assigned to the respective devices by a user, such as during setup of one or more of these devices. For instance, as shown in the illustrated example of FIG. 1B, a user may assign the name "Bookcase" to playback device 102d because it is physically situated on a bookcase. Similarly, the NMD 103f may be assigned the named "Island" because it is physically situated on an island countertop in the Kitchen 101h (FIG. 1A). Some playback devices may be assigned names according to a zone or room, such as the playback devices 102e, 102l, 102m, and 102n, which are named "Bedroom," "Dining Room," "Living Room," and "Office," respectively. Further, certain playback devices may have functionally descriptive names. For example, the playback devices 102a and 102b are assigned the names "Right" and "Front," respectively, because these two devices are configured to provide specific audio channels during media playback in the zone of the Den 101d (FIG. 1A). The playback device 102c in the Patio may be named portable because it is battery-powered and/or readily transportable to different areas of the environment 101. Other naming conventions are possible.

As discussed above, an NMD may detect and process sound from its environment, such as sound that includes background noise mixed with speech spoken by a person in the NMD's vicinity. For example, as sounds are detected by the NMD in the environment, the NMD may process the detected sound to determine if the sound includes speech that contains voice input intended for the NMD and ultimately a particular VAS. For example, the NMD may identify whether speech includes a wake word associated with a particular VAS.

In the illustrated example of FIG. 1B, the NMDs 103 are configured to interact with the VAS 190 over a network via the network 111 and the router 109. Interactions with the VAS 190 may be initiated, for example, when an NMD identifies in the detected sound a potential wake word. The identification causes a wake-word event, which in turn causes the NMD to begin transmitting detected-sound data to the VAS 190. In some implementations, the various local network devices 102-105 (FIG. 1A) and/or remote computing devices 106c of the MPS 100 may exchange various feedback, information, instructions, and/or related data with the remote computing devices associated with the selected VAS. Such exchanges may be related to or independent of transmitted messages containing voice inputs. In some embodiments, the remote computing device(s) and the MPS 100 may exchange data via communication paths as described herein and/or using a metadata exchange channel as described in U.S. application Ser. No. 15/438,749 filed Feb. 21, 2017, and titled "Voice Control of a Media Playback System," which is herein incorporated by reference in its entirety.

Upon receiving the stream of sound data, the VAS 190 determines if there is voice input in the streamed data from the NMD, and if so the VAS 190 will also determine an underlying intent in the voice input. The VAS 190 may next transmit a response back to the MPS 100, which can include transmitting the response directly to the NMD that caused the wake-word event. The response is typically based on the intent that the VAS 190 determined was present in the voice input. As an example, in response to the VAS 190 receiving a voice input with an utterance to "Play Hey Jude by The Beatles," the VAS 190 may determine that the underlying intent of the voice input is to initiate playback and further determine that intent of the voice input is to play the particular song "Hey Jude." After these determinations, the VAS 190 may transmit a command to a particular MCS 192 to retrieve content (i.e., the song "Hey Jude"), and that MCS 192, in turn, provides (e.g., streams) this content directly to the MPS 100 or indirectly via the VAS 190. In some implementations, the VAS 190 may transmit to the MPS 100 a command that causes the MPS 100 itself to retrieve the content from the MCS 192.

In certain implementations, NMDs may facilitate arbitration amongst one another when voice input is identified in speech detected by two or more NMDs located within proximity of one another. For example, the NMD-equipped playback device 102d in the environment 101 (FIG. 1A) is in relatively close proximity to the NMD-equipped Living Room playback device 102m, and both devices 102d and 102m may at least sometimes detect the same sound. In such cases, this may require arbitration as to which device is ultimately responsible for providing detected-sound data to the remote VAS. Examples of arbitrating between NMDs may be found, for example, in previously referenced U.S. application Ser. No. 15/438,749.

In certain implementations, an NMD may be assigned to, or otherwise associated with, a designated or default playback device that may not include an NMD. For example, the Island NMD 103f in the Kitchen 101h (FIG. 1A) may be assigned to the Dining Room playback device 102l, which is in relatively close proximity to the Island NMD 103f. In practice, an NMD may direct an assigned playback device to play audio in response to a remote VAS receiving a voice input from the NMD to play the audio, which the NMD might have sent to the VAS in response to a user speaking a command to play a certain song, album, playlist, etc. Additional details regarding assigning NMDs and playback devices as designated or default devices may be found, for example, in previously referenced U.S. patent application Ser. No. 15/438,749.

Further aspects relating to the different components of the example MPS 100 and how the different components may interact to provide a user with a media experience may be found in the following sections. While discussions herein may generally refer to the example MPS 100, technologies described herein are not limited to applications within, among other things, the home environment described above. For instance, the technologies described herein may be useful in other home environment configurations comprising more or fewer of any of the playback, network microphone, and/or controller devices 102-104. For example, the technologies herein may be utilized within an environment having a single playback device 102 and/or a single NMD 103. In some examples of such cases, the NETWORK 111 (FIG. 1B) may be eliminated and the single playback device 102 and/or the single NMD 103 may communicate directly with the remote computing devices 106-d. In some embodiments, a telecommunication network (e.g., an LTE network, a 5G network, etc.) may communicate with the various playback, network microphone, and/or controller devices 102-104 independent of a LAN.

a. Example Playback & Network Microphone Devices

Figure 2A:
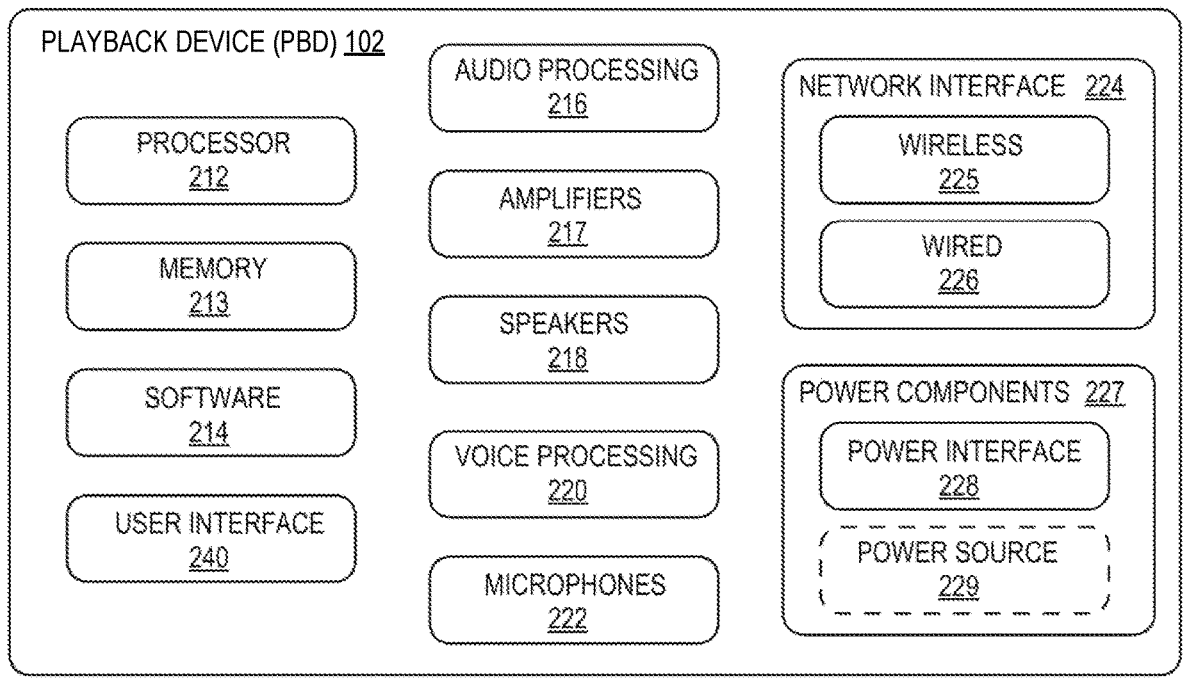
FIG. 2A is a functional block diagram of an example playback device.

FIG. 2A is a functional block diagram illustrating certain aspects of one of the playback devices 102 of the MPS 100 of FIGS. 1A and 1B. As shown, the playback device 102 includes various components, each of which is discussed in further detail below, and the various components of the playback device 102 may be operably coupled to one another via a system bus, communication network, or some other connection mechanism. In the illustrated example of FIG. 2A, the playback device 102 may be referred to as an "NMD-equipped" playback device because it includes components that support the functionality of an NMD, such as one of the NMDs 103 shown in FIG. 1A.

As shown, the playback device 102 includes at least one processor 212, which may be a clock-driven computing component configured to process input data according to instructions stored in memory 213. The memory 213 may be a tangible, non-transitory, computer-readable medium configured to store instructions that are executable by the processor 212. For example, the memory 213 may be data storage that can be loaded with software code 214 that is executable by the processor 212 to achieve certain functions.

In one example, these functions may involve the playback device 102 retrieving audio data from an audio source, which may be another playback device. In another example, the functions may involve the playback device 102 sending audio data, detected-sound data (e.g., corresponding to a voice input), and/or other information to another device on a network via at least one network interface 224. In yet another example, the functions may involve the playback device 102 causing one or more other playback devices to synchronously playback audio with the playback device 102. In yet a further example, the functions may involve the playback device 102 facilitating being paired or otherwise bonded with one or more other playback devices to create a multi-channel audio environment. Numerous other example functions are possible, some of which are discussed below.

As just mentioned, certain functions may involve the playback device 102 synchronizing playback of audio content with one or more other playback devices. During synchronous playback, a listener may not perceive time-delay differences between playback of the audio content by the synchronized playback devices. U.S. Pat. No. 8,234,395 filed on Apr. 4, 2004, and titled "System and method for synchronizing operations among a plurality of independently clocked digital data processing devices," which is hereby incorporated by reference in its entirety, provides in more detail some examples for audio playback synchronization among playback devices.

To facilitate audio playback, the playback device 102 includes audio processing components 216 that are generally configured to process audio prior to the playback device 102 rendering the audio. In this respect, the audio processing components 216 may include one or more digital-to-analog converters ("DAC"), one or more audio preprocessing components, one or more audio enhancement components, one or more digital signal processors ("DSPs"), and so on. In some implementations, one or more of the audio processing components 216 may be a subcomponent of the processor 212. In operation, the audio processing components 216 receive analog and/or digital audio and process and/or otherwise intentionally alter the audio to produce audio signals for playback.

The produced audio signals may then be provided to one or more audio amplifiers 217 for amplification and playback through one or more speakers 218 operably coupled to the amplifiers 217. The audio amplifiers 217 may include components configured to amplify audio signals to a level for driving one or more of the speakers 218.

Each of the speakers 218 may include an individual transducer (e.g., a "driver") or the speakers 218 may include a complete speaker system involving an enclosure with one or more drivers. A particular driver of a speaker 218 may include, for example, a subwoofer (e.g., for low frequencies), a mid-range driver (e.g., for middle frequencies), and/or a tweeter (e.g., for high frequencies). In some cases, a transducer may be driven by an individual corresponding audio amplifier of the audio amplifiers 217. In some implementations, a playback device may not include the speakers 218, but instead may include a speaker interface for connecting the playback device to external speakers. In certain embodiments, a playback device may include neither the speakers 218 nor the audio amplifiers 217, but instead may include an audio interface (not shown) for connecting the playback device to an external audio amplifier or audio-visual receiver.

In addition to producing audio signals for playback by the playback device 102, the audio processing components 216 may be configured to process audio to be sent to one or more other playback devices, via the network interface 224, for playback. In example scenarios, audio content to be processed and/or played back by the playback device 102 may be received from an external source, such as via an audio line-in interface (e.g., an auto-detecting 3.5 mm audio line-in connection) of the playback device 102 (not shown) or via the network interface 224, as described below.

As shown, the at least one network interface 224, may take the form of one or more wireless interfaces 225 and/or one or more wired interfaces 226. A wireless interface may provide network interface functions for the playback device 102 to wirelessly communicate with other devices (e.g., other playback device(s), NMD(s), and/or controller device(s)) in accordance with a communication protocol (e.g., any wireless standard including IEEE 802.11a, 802.11b, 802.11g, 802.11n, 802.11ac, 802.15, 4G mobile communication standard, and so on). A wired interface may provide network interface functions for the playback device 102 to communicate over a wired connection with other devices in accordance with a communication protocol (e.g., IEEE 802.3). While the network interface 224 shown in FIG. 2A include both wired and wireless interfaces, the playback device 102 may in some implementations include only wireless interface(s) or only wired interface(s).

In general, the network interface 224 facilitates data flow between the playback device 102 and one or more other devices on a data network. For instance, the playback device 102 may be configured to receive audio content over the data network from one or more other playback devices, network devices within a LAN, and/or audio content sources over a WAN, such as the Internet. In one example, the audio content and other signals transmitted and received by the playback device 102 may be transmitted in the form of digital packet data comprising an Internet Protocol (IP)-based source address and IP-based destination addresses. In such a case, the network interface 224 may be configured to parse the digital packet data such that the data destined for the playback device 102 is properly received and processed by the playback device 102.

As shown in FIG. 2A, the playback device 102 also includes voice processing components 220 that are operably coupled to one or more microphones 222. The microphones 222 are configured to detect sound (i.e., acoustic waves) in the environment of the playback device 102, which is then provided to the voice processing components 220. More specifically, each microphone 222 is configured to detect sound and convert the sound into a digital or analog signal representative of the detected sound, which can then cause the voice processing component 220 to perform various functions based on the detected sound, as described in greater detail below. In one implementation, the microphones 222 are arranged as an array of microphones (e.g., an array of six microphones). In some implementations, the playback device 102 includes more than six microphones (e.g., eight microphones or twelve microphones) or fewer than six microphones (e.g., four microphones, two microphones, or a single microphones).

In operation, the voice-processing components 220 are generally configured to detect and process sound received via the microphones 222, identify potential voice input in the detected sound, and extract detected-sound data to enable a VAS, such as the VAS 190 (FIG. 1B), to process voice input identified in the detected-sound data. The voice processing components 220 may include one or more analog-to-digital converters, an acoustic echo canceller ("AEC"), a spatial processor (e.g., one or more multi-channel Wiener filters, one or more other filters, and/or one or more beam former components), one or more buffers (e.g., one or more circular buffers), one or more wake-word engines, one or more voice extractors, and/or one or more speech processing components (e.g., components configured to recognize a voice of a particular user or a particular set of users associated with a household), among other example voice processing components. In example implementations, the voice processing components 220 may include or otherwise take the form of one or more DSPs or one or more modules of a DSP. In this respect, certain voice processing components 220 may be configured with particular parameters (e.g., gain and/or spectral parameters) that may be modified or otherwise tuned to achieve particular functions. In some implementations, one or more of the voice processing components 220 may be a subcomponent of the processor 212.

As further shown in FIG. 2A, the playback device 102 also includes power components 227. The power components 227 include at least an external power source interface 228, which may be coupled to a power source (not shown) via a power cable or the like that physically connects the playback device 102 to an electrical outlet or some other external power source. Other power components may include, for example, transformers, converters, and like components configured to format electrical power.

In some implementations, the power components 227 of the playback device 102 may additionally include an internal power source 229 (e.g., one or more batteries) configured to power the playback device 102 without a physical connection to an external power source. When equipped with the internal power source 229, the playback device 102 may operate independent of an external power source. In some such implementations, the external power source interface 228 may be configured to facilitate charging the internal power source 229. As discussed before, a playback device comprising an internal power source may be referred to herein as a "portable playback device." On the other hand, a playback device that operates using an external power source may be referred to herein as a "stationary playback device," although such a device may in fact be moved around a home or other environment.

The playback device 102 further includes a user interface 240 that may facilitate user interactions independent of or in conjunction with user interactions facilitated by one or more of the controller devices 104. In various embodiments, the user interface 240 includes one or more physical buttons and/or supports graphical interfaces provided on touch sensitive screen(s) and/or surface(s), among other possibilities, for a user to directly provide input. The user interface 240 may further include one or more of lights (e.g., LEDs) and the speakers to provide visual and/or audio feedback to a user.

Figure 2B:
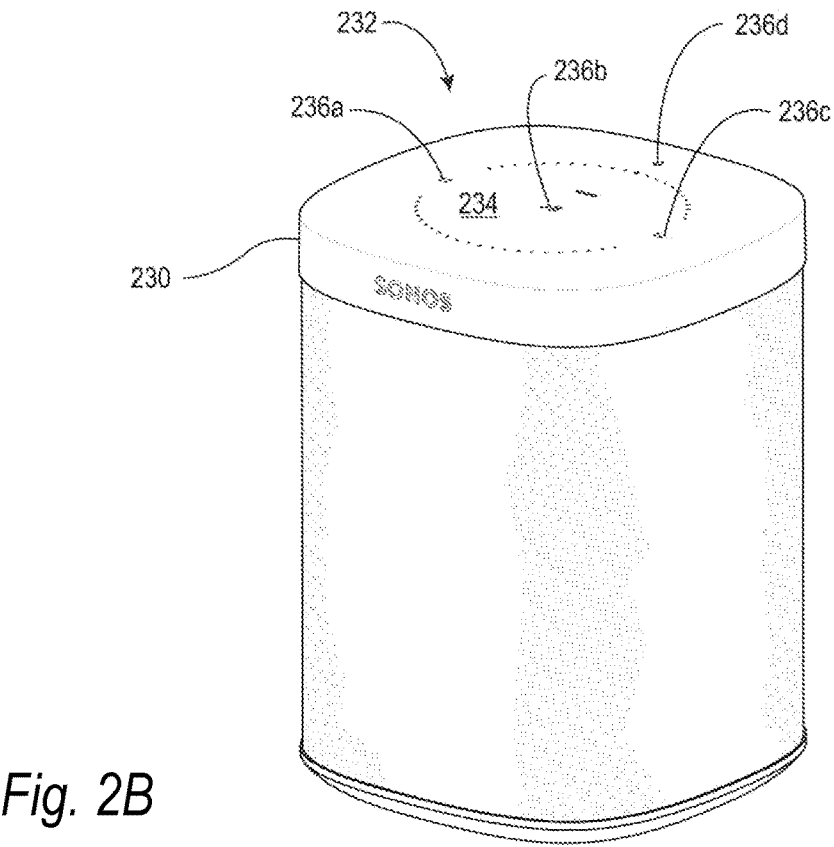
FIG. 2B is an isometric diagram of an example housing of the playback device of FIG. 2A.

As an illustrative example, FIG. 2B shows an example housing 230 of the playback device 102 that includes a user interface in the form of a control area 232 at a top portion 234 of the housing 230. The control area 232 includes buttons 236a-c for controlling audio playback, volume level, and other functions. The control area 232 also includes a button 236d for toggling the microphones 222 to either an on state or an off state.

As further shown in FIG. 2B, the control area 232 is at least partially surrounded by apertures formed in the top portion 234 of the housing 230 through which the microphones 222 (not visible in FIG. 2B) receive the sound in the environment of the playback device 102. The microphones 222 may be arranged in various positions along and/or within the top portion 234 or other areas of the housing 230 so as to detect sound from one or more directions relative to the playback device 102.

By way of illustration, SONOS, Inc. presently offers (or has offered) for sale certain playback devices that may implement certain of the embodiments disclosed herein, including a "PLAY:1," "PLAY:3," "PLAY:5," "PLAYBAR," "CONNECT:AMP," "PLAYBASE," "BEAM," "CONNECT," and "SUB." Any other past, present, and/or future playback devices may additionally or alternatively be used to implement the playback devices of example embodiments disclosed herein. Additionally, it should be understood that a playback device is not limited to the examples illustrated in FIG. 2A or 2B or to the SONOS product offerings. For example, a playback device may include, or otherwise take the form of, a wired or wireless headphone set, which may operate as a part of the MPS 100 via a network interface or the like. In another example, a playback device may include or interact with a docking station for personal mobile media playback devices. In yet another example, a playback device may be integral to another device or component such as a television, a lighting fixture, or some other device for indoor or outdoor use.

b. Example Playback Device Configurations

FIGS. 3A-3E show example configurations of playback devices. Referring first to FIG. 3A, in some example instances, a single playback device may belong to a zone. For example, the playback device 102c (FIG. 1A) on the Patio may belong to Zone A. In some implementations described below, multiple playback devices may be "bonded" to form a "bonded pair," which together form a single zone. For example, the playback device 102f (FIG. 1A) named "Bed 1" in FIG. 3A may be bonded to the playback device 102g (FIG. 1A) named "Bed 2" in FIG. 3A to form Zone B. Bonded playback devices may have different playback responsibilities (e.g., channel responsibilities). In another implementation described below, multiple playback devices may be merged to form a single zone. For example, the playback device 102d named "Bookcase" may be merged with the playback device 102m named "Living Room" to form a single Zone C. The merged playback devices 102d and 102m may not be specifically assigned different playback responsibilities. That is, the merged playback devices 102d and 102m may, aside from playing audio content in synchrony, each play audio content as they would if they were not merged.

For purposes of control, each zone in the MPS 100 may be represented as a single user interface ("UI") entity. For example, as displayed by the controller devices 104, Zone A may be provided as a single entity named "Portable," Zone B may be provided as a single entity named "Stereo," and Zone C may be provided as a single entity named "Living Room."

In various embodiments, a zone may take on the name of one of the playback devices belonging to the zone. For example, Zone C may take on the name of the Living Room device 102m (as shown). In another example, Zone C may instead take on the name of the Bookcase device 102d. In a further example, Zone C may take on a name that is some combination of the Bookcase device 102d and Living Room device 102m. The name that is chosen may be selected by a user via inputs at a controller device 104. In some embodiments, a zone may be given a name that is different than the device(s) belonging to the zone. For example, Zone B in FIG. 3A is named "Stereo" but none of the devices in Zone B have this name. In one aspect, Zone B is a single UI entity representing a single device named "Stereo," composed of constituent devices "Bed 1" and "Bed 2." In one implementation, the Bed 1 device may be playback device 102f in the master bedroom 101h (FIG. 1A) and the Bed 2 device may be the playback device 102g also in the master bedroom 101h (FIG. 1A).

As noted above, playback devices that are bonded may have different playback responsibilities, such as playback responsibilities for certain audio channels. For example, as shown in FIG. 3B, the Bed 1 and Bed 2 devices 102f and 102g may be bonded so as to produce or enhance a stereo effect of audio content. In this example, the Bed 1 playback device 102*f* may be configured to play a left channel audio component, while the Bed 2 playback device 102*g* may be configured to play a right channel audio component. In some implementations, such stereo bonding may be referred to as "pairing."

Additionally, playback devices that are configured to be bonded may have additional and/or different respective speaker drivers. As shown in FIG. 3C, the playback device 102*b* named "Front" may be bonded with the playback device 102*k* named "SUB." The Front device 102*b* may render a range of mid to high frequencies, and the SUB device 102*k* may render low frequencies as, for example, a subwoofer. When unbonded, the Front device 102*b* may be configured to render a full range of frequencies. As another example, FIG. 3D shows the Front and SUB devices 102*b* and 102*k* further bonded with Right and Left playback devices 102*a* and 102*j*, respectively. In some implementations, the Right and Left devices 102*a* and 102*j* may form surround or "satellite" channels of a home theater system. The bonded playback devices 102*a*, 102*b*, 102*j*, and 102*k* may form a single Zone D (FIG. 3A).

In some implementations, playback devices may also be "merged." In contrast to certain bonded playback devices, playback devices that are merged may not have assigned playback responsibilities, but may each render the full range of audio content that each respective playback device is capable of. Nevertheless, merged devices may be represented as a single UI entity (i.e., a zone, as discussed above). For instance, FIG. 3E shows the playback devices 102*d* and 102*m* in the Living Room merged, which would result in these devices being represented by the single UI entity of Zone C. In one embodiment, the playback devices 102*d* and 102*m* may playback audio in synchrony, during which each outputs the full range of audio content that each respective playback device 102*d* and 102*m* is capable of rendering.

In some embodiments, a stand-alone NMD may be in a zone by itself. For example, the NMD 103*h* from FIG. 1A is named "Closet" and forms Zone I in FIG. 3A. An NMD may also be bonded or merged with another device so as to form a zone. For example, the NMD device 103*f* named "Island" may be bonded with the playback device 102*i* Kitchen, which together form Zone F, which is also named "Kitchen." Additional details regarding assigning NMDs and playback devices as designated or default devices may be found, for example, in previously referenced U.S. patent application Ser. No. 15/438,749. In some embodiments, a stand-alone NMD may not be assigned to a zone.

Zones of individual, bonded, and/or merged devices may be arranged to form a set of playback devices that playback audio in synchrony. Such a set of playback devices may be referred to as a "group," "zone group," "synchrony group," or "playback group." In response to inputs provided via a controller device 104, playback devices may be dynamically grouped and ungrouped to form new or different groups that synchronously play back audio content. For example, referring to FIG. 3A, Zone A may be grouped with Zone B to form a zone group that includes the playback devices of the two zones. As another example, Zone A may be grouped with one or more other Zones C-I. The Zones A-I may be grouped and ungrouped in numerous ways. For example, three, four, five, or more (e.g., all) of the Zones A-I may be grouped. When grouped, the zones of individual and/or bonded playback devices may play back audio in synchrony with one another, as described in previously referenced U.S. Pat. No. 8,234,395. Grouped and bonded devices are example types of associations between portable and stationary playback devices that may be caused in response to a trigger event, as discussed above and described in greater detail below.

In various implementations, the zones in an environment may be assigned a particular name, which may be the default name of a zone within a zone group or a combination of the names of the zones within a zone group, such as "Dining Room+Kitchen," as shown in FIG. 3A. In some embodiments, a zone group may be given a unique name selected by a user, such as "Nick's Room," as also shown in FIG. 3A. The name "Nick's Room" may be a name chosen by a user over a prior name for the zone group, such as the room name "Master Bedroom."

Referring back to FIG. 2A, certain data may be stored in the memory 213 as one or more state variables that are periodically updated and used to describe the state of a playback zone, the playback device(s), and/or a zone group associated therewith. The memory 213 may also include the data associated with the state of the other devices of the MPS 100, which may be shared from time to time among the devices so that one or more of the devices have the most recent data associated with the system.

In some embodiments, the memory 213 of the playback device 102 may store instances of various variable types associated with the states. Variables instances may be stored with identifiers (e.g., tags) corresponding to type. For example, certain identifiers may be a first type "a1" to identify playback device(s) of a zone, a second type "b1" to identify playback device(s) that may be bonded in the zone, and a third type "c1" to identify a zone group to which the zone may belong. As a related example, in FIG. 1A, identifiers associated with the Patio may indicate that the Patio is the only playback device of a particular zone and not in a zone group. Identifiers associated with the Living Room may indicate that the Living Room is not grouped with other zones but includes bonded playback devices 102*a*, 102*b*, 102*j*, and 102*k*. Identifiers associated with the Dining Room may indicate that the Dining Room is part of Dining Room+Kitchen group and that devices 103*f* and 102*i* are bonded. Identifiers associated with the Kitchen may indicate the same or similar information by virtue of the Kitchen being part of the Dining Room+Kitchen zone group. Other example zone variables and identifiers are described below.

In yet another example, the MPS 100 may include variables or identifiers representing other associations of zones and zone groups, such as identifiers associated with Areas, as shown in FIG. 3A. An Area may involve a cluster of zone groups and/or zones not within a zone group. For instance, FIG. 3A shows a first area named "First Area" and a second area named "Second Area." The First Area includes zones and zone groups of the Patio, Den, Dining Room, Kitchen, and Bathroom. The Second Area includes zones and zone groups of the Bathroom, Nick's Room, Bedroom, and Living Room. In one aspect, an Area may be used to invoke a cluster of zone groups and/or zones that share one or more zones and/or zone groups of another cluster. In this respect, such an Area differs from a zone group, which does not share a zone with another zone group. Further examples of techniques for implementing Areas may be found, for example, in U.S. application Ser. No. 15/682,506 filed Aug. 21, 2017 and titled "Room Association Based on Name," and U.S. Pat. No. 8,483,853 filed Sep. 11, 2007, and titled "Controlling and manipulating groupings in a multi-zone media system." Each of these applications is incorporated herein by reference in its entirety. In some embodiments, the MPS 100 may not implement Areas, in which case the system may not store variables associated with Areas.

The memory 213 may be further configured to store other data. Such data may pertain to audio sources accessible by the playback device 102 or a playback queue that the playback device (or some other playback device(s)) may be associated with. In embodiments described below, the memory 213 is configured to store a set of command data for selecting a particular VAS when processing voice inputs. During operation, one or more playback zones in the environment of FIG. 1A may each be playing different audio content. For instance, the user may be grilling in the Patio zone and listening to hip hop music being played by the playback device 102c, while another user may be preparing food in the Kitchen zone and listening to classical music being played by the playback device 102i. In another example, a playback zone may play the same audio content in synchrony with another playback zone.

For instance, the user may be in the Office zone where the playback device 102n is playing the same hip-hop music that is being playing by playback device 102c in the Patio zone. In such a case, playback devices 102c and 102n may be playing the hip-hop in synchrony such that the user may seamlessly (or at least substantially seamlessly) enjoy the audio content that is being played out-loud while moving between different playback zones. Synchronization among playback zones may be achieved in a manner similar to that of synchronization among playback devices, as described in previously referenced U.S. Pat. No. 8,234,395.

As suggested above, the zone configurations of the MPS 100 may be dynamically modified. As such, the MPS 100 may support numerous configurations. For example, if a user physically moves one or more playback devices to or from a zone, the MPS 100 may be reconfigured to accommodate the change(s). For instance, if the user physically moves the playback device 102c from the Patio zone to the Office zone, the Office zone may now include both the playback devices 102c and 102n. In some cases, the user may pair or group the moved playback device 102c with the Office zone and/or rename the players in the Office zone using, for example, one of the controller devices 104 and/or voice input. As another example, if one or more playback devices 102 are moved to a particular space in the home environment that is not already a playback zone, the moved playback device(s) may be renamed or associated with a playback zone for the particular space.

Further, different playback zones of the MPS 100 may be dynamically combined into zone groups or split up into individual playback zones. For example, the Dining Room zone and the Kitchen zone may be combined into a zone group for a dinner party such that playback devices 102i and 102l may render audio content in synchrony. As another example, bonded playback devices in the Den zone may be split into (i) a television zone and (ii) a separate listening zone. The television zone may include the Front playback device 102b. The listening zone may include the Right, Left, and SUB playback devices 102a, 102j, and 102k, which may be grouped, paired, or merged, as described above. Splitting the Den zone in such a manner may allow one user to listen to music in the listening zone in one area of the living room space, and another user to watch the television in another area of the living room space. In a related example, a user may utilize either of the NMD 103a or 103b (FIG. 1B) to control the Den zone before it is separated into the television zone and the listening zone. Once separated, the listening zone may be controlled, for example, by a user in the vicinity of the NMD 103a, and the television zone may be controlled, for example, by a user in the vicinity of the NMD 103b. As described above, however, any of the NMDs 103 may be configured to control the various playback and other devices of the MPS 100.

c. Example Controller Devices

FIG. 4 is a functional block diagram illustrating certain aspects of a selected one of the controller devices 104 of the MPS 100 of FIG. 1A. Such controller devices may also be referred to herein as a "control device" or "controller." The controller device shown in FIG. 4 may include components that are generally similar to certain components of the network devices described above, such as a processor 412, memory 413 storing program software 414, at least one network interface 424, and one or more microphones 422. In one example, a controller device may be a dedicated controller for the MPS 100. In another example, a controller device may be a network device on which media playback system controller application software may be installed, such as for example, an iPhone™, iPad™ or any other smart phone, tablet, or network device (e.g., a networked computer such as a PC or Mac™).

The memory 413 of the controller device 104 may be configured to store controller application software and other data associated with the MPS 100 and/or a user of the system 100. The memory 413 may be loaded with instructions in software 414 that are executable by the processor 412 to achieve certain functions, such as facilitating user access, control, and/or configuration of the MPS 100. The controller device 104 is configured to communicate with other network devices via the network interface 424, which may take the form of a wireless interface, as described above.

In one example, system information (e.g., such as a state variable) may be communicated between the controller device 104 and other devices via the network interface 424. For instance, the controller device 104 may receive playback zone and zone group configurations in the MPS 100 from a playback device, an NMD, or another network device. Likewise, the controller device 104 may transmit such system information to a playback device or another network device via the network interface 424. In some cases, the other network device may be another controller device.

The controller device 104 may also communicate playback device control commands, such as volume control and audio playback control, to a playback device via the network interface 424. As suggested above, changes to configurations of the MPS 100 may also be performed by a user using the controller device 104. The configuration changes may include adding/removing one or more playback devices to/from a zone, adding/removing one or more zones to/from a zone group, forming a bonded or merged player, separating one or more playback devices from a bonded or merged player, among others.

As shown in FIG. 4, the controller device 104 also includes a user interface 440 that is generally configured to facilitate user access and control of the MPS 100. The user interface 440 may include a touch-screen display or other physical interface configured to provide various graphical controller interfaces, such as the controller interfaces 540a and 540b shown in FIGS. 5A and 5B. Referring to FIGS. 5A and 5B together, the controller interfaces 540a and 540b includes a playback control region 542, a playback zone region 543, a playback status region 544, a playback queue region 546, and a sources region 548. The user interface as shown is just one example of an interface that may be provided on a network device, such as the controller device shown in FIG. 4, and accessed by users to control a media playback system, such as the MPS 100. Other user interfaces of varying formats, styles, and interactive sequences may alternatively be implemented on one or more network devices to provide comparable control access to a media playback system.

The playback control region 542 (FIG. 5A) may include selectable icons (e.g., by way of touch or by using a cursor) that, when selected, cause playback devices in a selected playback zone or zone group to play or pause, fast forward, rewind, skip to next, skip to previous, enter/exit shuffle mode, enter/exit repeat mode, enter/exit cross fade mode, etc. The playback control region 542 may also include selectable icons that, when selected, modify equalization settings and/or playback volume, among other possibilities.

The playback zone region 543 (FIG. 5B) may include representations of playback zones within the MPS 100. The playback zones regions 543 may also include a representation of zone groups, such as the Dining Room+Kitchen zone group, as shown.

In some embodiments, the graphical representations of playback zones may be selectable to bring up additional selectable icons to manage or configure the playback zones in the MPS 100, such as a creation of bonded zones, creation of zone groups, separation of zone groups, and renaming of zone groups, among other possibilities.

For example, as shown, a "group" icon may be provided within each of the graphical representations of playback zones. The "group" icon provided within a graphical representation of a particular zone may be selectable to bring up options to select one or more other zones in the MPS 100 to be grouped with the particular zone. Once grouped, playback devices in the zones that have been grouped with the particular zone will be configured to play audio content in synchrony with the playback device(s) in the particular zone. Analogously, a "group" icon may be provided within a graphical representation of a zone group. In this case, the "group" icon may be selectable to bring up options to deselect one or more zones in the zone group to be removed from the zone group. Other interactions and implementations for grouping and ungrouping zones via a user interface are also possible. The representations of playback zones in the playback zone region 543 (FIG. 5B) may be dynamically updated as playback zone or zone group configurations are modified.

The playback status region 544 (FIG. 5A) may include graphical representations of audio content that is presently being played, previously played, or scheduled to play next in the selected playback zone or zone group. The selected playback zone or zone group may be visually distinguished on a controller interface, such as within the playback zone region 543 and/or the playback status region 544. The graphical representations may include track title, artist name, album name, album year, track length, and/or other relevant information that may be useful for the user to know when controlling the MPS 100 via a controller interface.

The playback queue region 546 may include graphical representations of audio content in a playback queue associated with the selected playback zone or zone group. In some embodiments, each playback zone or zone group may be associated with a playback queue comprising information corresponding to zero or more audio items for playback by the playback zone or zone group. For instance, each audio item in the playback queue may comprise a uniform resource identifier (URI), a uniform resource locator (URL), or some other identifier that may be used by a playback device in the playback zone or zone group to find and/or retrieve the audio item from a local audio content source or a networked audio content source, which may then be played back by the playback device.

In one example, a playlist may be added to a playback queue, in which case information corresponding to each audio item in the playlist may be added to the playback queue. In another example, audio items in a playback queue may be saved as a playlist. In a further example, a playback queue may be empty, or populated but "not in use" when the playback zone or zone group is playing continuously streamed audio content, such as Internet radio that may continue to play until otherwise stopped, rather than discrete audio items that have playback durations. In an alternative embodiment, a playback queue can include Internet radio and/or other streaming audio content items and be "in use" when the playback zone or zone group is playing those items. Other examples are also possible.

When playback zones or zone groups are "grouped" or "ungrouped," playback queues associated with the affected playback zones or zone groups may be cleared or re-associated. For example, if a first playback zone including a first playback queue is grouped with a second playback zone including a second playback queue, the established zone group may have an associated playback queue that is initially empty, that contains audio items from the first playback queue (such as if the second playback zone was added to the first playback zone), that contains audio items from the second playback queue (such as if the first playback zone was added to the second playback zone), or a combination of audio items from both the first and second playback queues.

Subsequently, if the established zone group is ungrouped, the resulting first playback zone may be re-associated with the previous first playback queue or may be associated with a new playback queue that is empty or contains audio items from the playback queue associated with the established zone group before the established zone group was ungrouped. Similarly, the resulting second playback zone may be re-associated with the previous second playback queue or may be associated with a new playback queue that is empty or contains audio items from the playback queue associated with the established zone group before the established zone group was ungrouped. Other examples are also possible.

With reference still to FIGS. 5A and 5B, the graphical representations of audio content in the playback queue region 646 (FIG. 5A) may include track titles, artist names, track lengths, and/or other relevant information associated with the audio content in the playback queue. In one example, graphical representations of audio content may be selectable to bring up additional selectable icons to manage and/or manipulate the playback queue and/or audio content represented in the playback queue. For instance, a represented audio content may be removed from the playback queue, moved to a different position within the playback queue, or selected to be played immediately, or after any currently playing audio content, among other possibilities. A playback queue associated with a playback zone or zone group may be stored in a memory on one or more playback devices in the playback zone or zone group, on a playback device that is not in the playback zone or zone group, and/or some other designated device. Playback of such a playback queue may involve one or more playback devices playing back media items of the queue, perhaps in sequential or random order.

The sources region 548 may include graphical representations of selectable audio content sources and/or selectable voice assistants associated with a corresponding VAS. The VASes may be selectively assigned. In some examples, multiple VASes, such as AMAZON's Alexa, MICROSOFT's Cortana, etc., may be invokable by the same NMD. In some embodiments, a user may assign a VAS exclusively to one or more NMDs. For example, a user may assign a first VAS to one or both of the NMDs 102*a* and 102*b* in the Living Room shown in FIG. 1A, and a second VAS to the NMD 103*f* in the Kitchen. Other examples are possible.

d. Example Audio Content Sources

The audio sources in the sources region 548 may be audio content sources from which audio content may be retrieved and played by the selected playback zone or zone group. One or more playback devices in a zone or zone group may be configured to retrieve for playback audio content (e.g., according to a corresponding URI or URL for the audio content) from a variety of available audio content sources. In one example, audio content may be retrieved by a playback device directly from a corresponding audio content source (e.g., via a line-in connection). In another example, audio content may be provided to a playback device over a network via one or more other playback devices or network devices. As described in greater detail below, in some embodiments audio content may be provided by one or more media content services.

Example audio content sources may include a memory of one or more playback devices in a media playback system such as the MPS 100 of FIG. 1, local music libraries on one or more network devices (e.g., a controller device, a network-enabled personal computer, or a networked-attached storage ("NAS")), streaming audio services providing audio content via the Internet (e.g., cloud-based music services), or audio sources connected to the media playback system via a line-in input connection on a playback device or network device, among other possibilities.

In some embodiments, audio content sources may be added or removed from a media playback system such as the MPS 100 of FIG. 1A. In one example, an indexing of audio items may be performed whenever one or more audio content sources are added, removed, or updated. Indexing of audio items may involve scanning for identifiable audio items in all folders/directories shared over a network accessible by playback devices in the media playback system and generating or updating an audio content database comprising metadata (e.g., title, artist, album, track length, among others) and other associated information, such as a URI or URL for each identifiable audio item found. Other examples for managing and maintaining audio content sources may also be possible.

Figure 6:
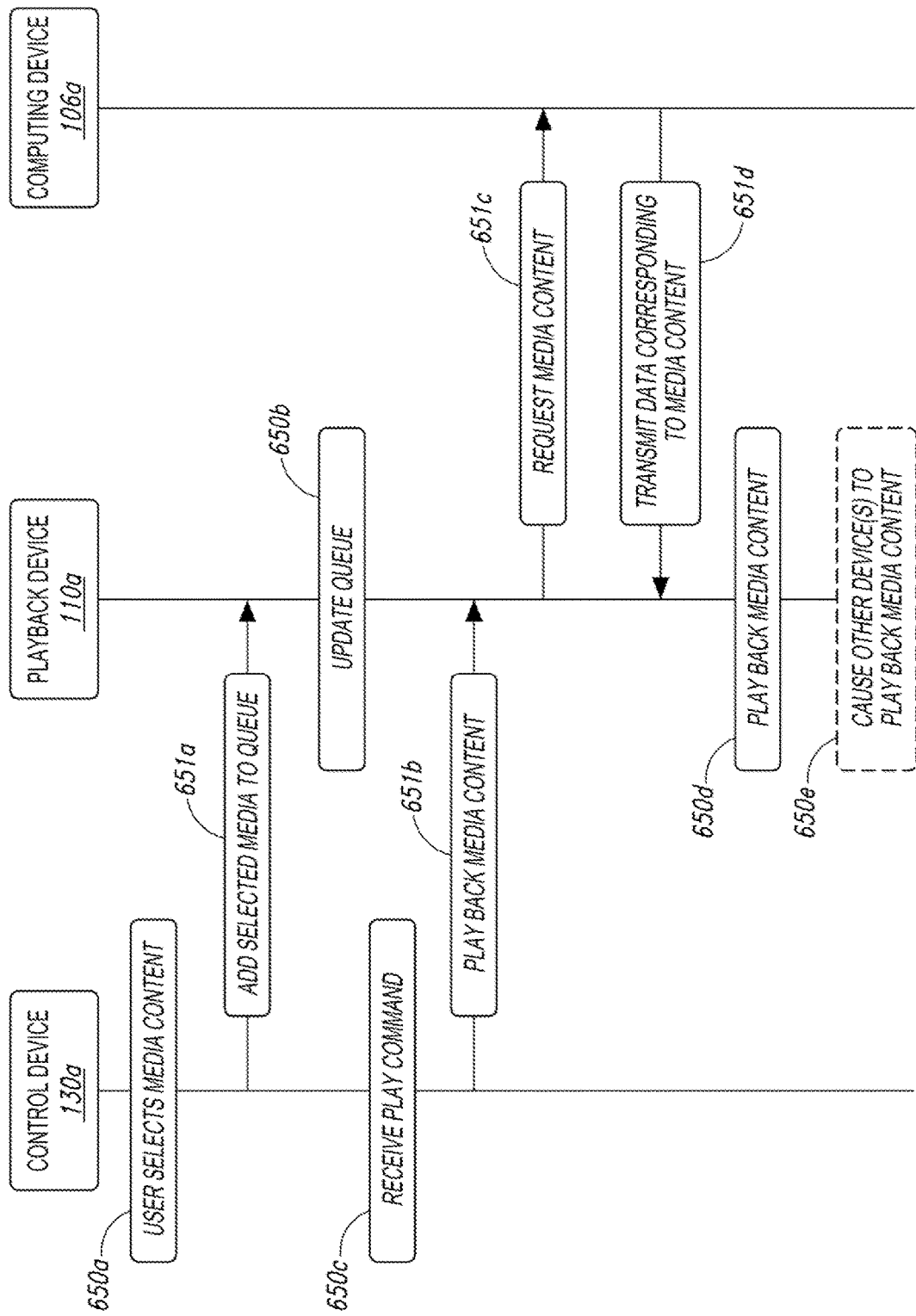
FIG. 6 is a message flow diagram of a media playback system.

FIG. 6 is a message flow diagram illustrating data exchanges between devices of the MPS 100. At step 650*a*, the MPS 100 receives an indication of selected media content (e.g., one or more songs, albums, playlists, podcasts, videos, stations) via the control device 104. The selected media content can comprise, for example, media items stored locally on or more devices (e.g., the audio source 105 of FIG. 1C) connected to the media playback system and/or media items stored on one or more media service servers (one or more of the remote computing devices 106 of FIG. 1B). In response to receiving the indication of the selected media content, the control device 104 transmits a message 651*a* to the playback device 102 (FIGS. 1A-1C) to add the selected media content to a playback queue on the playback device 102.

At step 650*b*, the playback device 102 receives the message 651*a* and adds the selected media content to the playback queue for play back.

At step 650*c*, the control device 104 receives input corresponding to a command to play back the selected media content. In response to receiving the input corresponding to the command to play back the selected media content, the control device 104 transmits a message 651*b* to the playback device 102 causing the playback device 102 to play back the selected media content. In response to receiving the message 651*b*, the playback device 102 transmits a message 651*c* to the computing device 106 requesting the selected media content. The computing device 106, in response to receiving the message 651*c*, transmits a message 651*d* comprising data (e.g., audio data, video data, a URL, a URI) corresponding to the requested media content.

At step 650*d*, the playback device 102 receives the message 651*d* with the data corresponding to the requested media content and plays back the associated media content.

At step 650*e*, the playback device 102 optionally causes one or more other devices to play back the selected media content. In one example, the playback device 102 is one of a bonded zone of two or more players (FIG. 1M). The playback device 102 can receive the selected media content and transmit all or a portion of the media content to other devices in the bonded zone. In another example, the playback device 102 is a coordinator of a group and is configured to transmit and receive timing information from one or more other devices in the group. The other one or more devices in the group can receive the selected media content from the computing device 106, and begin playback of the selected media content in response to a message from the playback device 102 such that all of the devices in the group play back the selected media content in synchrony.

III. Example Mobile Device to Facilitate Playback Session Transitions

Figure 7A:
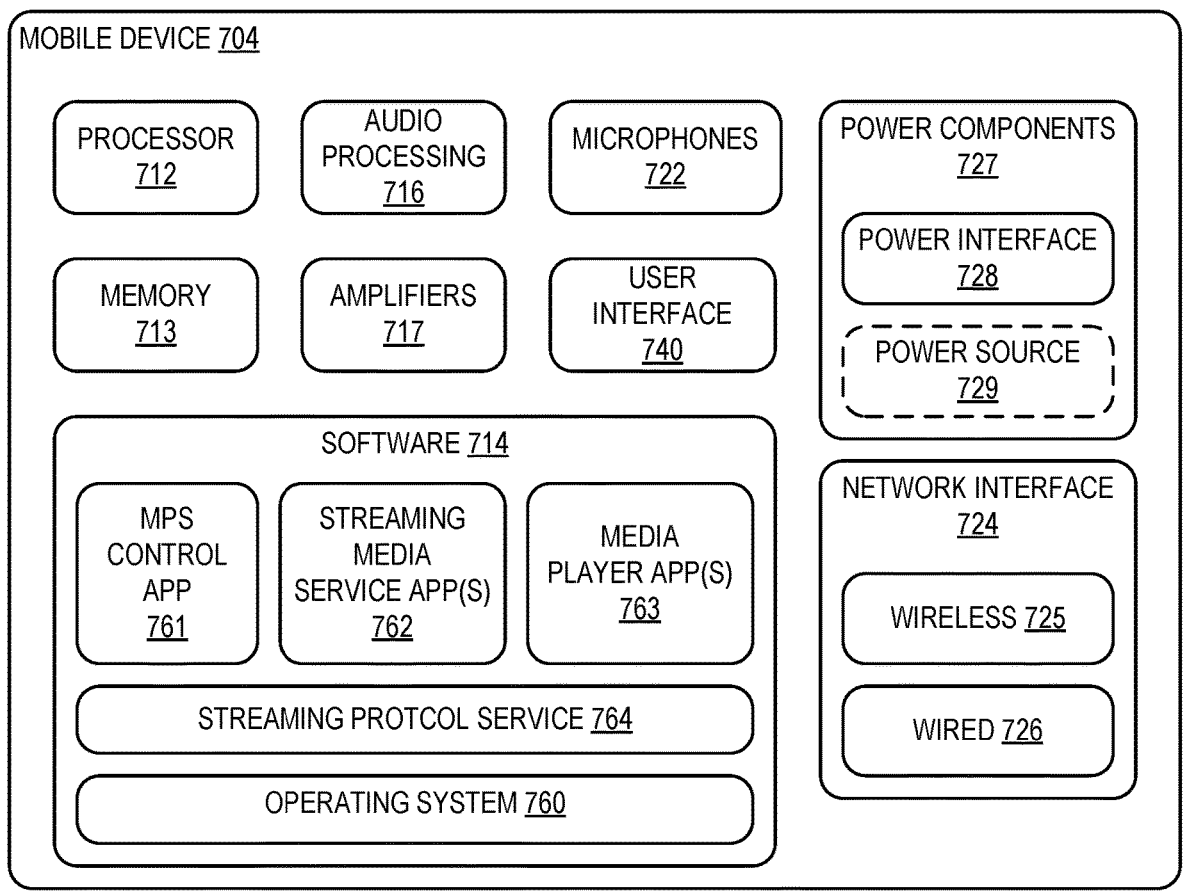
FIG. 7A is a functional block diagram of an example mobile device, in accordance with aspects of the disclosure.

In some example implementations, a mobile device, such as a smartphone or tablet, may facilitate playback session transitions across different platforms. FIG. 7A is a functional block diagram illustrating certain aspects of an example mobile device 704. As shown, the mobile device 704 includes various components, each of which is discussed in further detail below. The various components of the mobile device 104 may be operably coupled to one another via a system bus, communication network, or some other connection mechanism.

As shown, the mobile device 704 includes at least one processor 712, which may be a clock-driven computing component configured to process input data according to instructions stored in memory 713. The memory 713 may be a tangible, non-transitory, computer-readable medium configured to store instructions that are executable by the processor 712. For example, the memory 713 may be data storage that can be loaded with software code 714 that is executable by the processor 712 to achieve certain functions.

The mobile device 704 also includes audio processing components 216, amplifiers 217, and/or speakers 218. These audio components may be used for telephony functions (e.g., voice and/or video calls) as well as audio playback. Generally, in an effort to be commercially viable as a mobile device, the mobile device 704 includes relatively less capable versions of these audio components as compared with the playback devices 102, which may include relatively more capable versions of the audio processing components 216, amplifiers 217, and/or speakers 218 specifically intended for audio playback.

The at least one network interface 724 may take the form of one or more wireless interfaces 725 and/or one or more wired interfaces 726. The wireless interface 725 may provide network interface functions for the NMD 703 to wirelessly communicate with other devices (e.g., playback device(s) 102, other NMD(s) 103, and/or controller device(s) 104) in accordance with a communication protocol (e.g., any wireless standard including IEEE 802.11a, 802.11b, 802.11g, 802.11n, 802.11ac, 802.15, 4G mobile communication standard, and so on). The wired interface 726 may provide network interface functions for the NMD 703 to communicate over a wired connection with other devices in accordance with a communication protocol (e.g., IEEE 802.3). While the network interface 724 shown in FIG. 7A includes both wired and wireless interfaces, the playback device 102 may in various implementations include only wireless interface(s) or only wired interface(s).

The software code 714 may include an operating system 760, such as Apple iOS or ANDROID. The operating system 760 is software that includes basic features like process management, interrupts, memory management, a file system, device drivers, networking, security, and input/output. For hardware functions such as input and output and memory allocation, the operating system acts as an intermediary between applications (apps) and the computer hardware, allowing the apps to use hardware such as the network interface(s) 724 and the user interface 740.

The software code 714 further includes various applications ("apps"). By way of illustration, the mobile device 704 includes a media playback system (MPS) control app 761, one or more streaming media service apps 762, and one or more media player apps 763. General purpose mobile devices 704 will generally include additional applications.

The mobile device 104 further includes a user interface 740 that may facilitate user interactions independent of or in conjunction with user interactions facilitated by one or more of the controller devices 104. In various embodiments, the user interface 740 includes a touch-sensitive graphical display, which can display various control interfaces provided by the operating system 760 and/or the MPS control app 761, the streaming media service app(s) 762, and/or the media player app(s) 763, as well as other apps that may be installed on the mobile device 704.

By executing the MPS control app 761, the mobile device 704 may function as the control device 104. The MPS control app 761 provides control of the media playback system 100 (FIGS. 1A and 1B) in a first domain (referred to herein as a native domain). In particular, the MPS control app 761 may cause the user interface 740 to display controller interface(s) with playback controls to facilitate control of the playback devices 102 (e.g., the controller interfaces 540a and/or 540b shown in FIGS. 5A and 5B). A commercial embodiment of the MPS control app 761 is the SONOS app, currently available for APPLE iOS, ANDROID, WINDOWS, and MAC.

A user may start a playback session in the native domain by using the controller interface(s) of the MPS control app 761. In particular, a user may use the controller interface(s) of the MPS control app 761 to select the Kitchen zone (including the playback device 102i) and to select one or more media items to play back in the Kitchen zone. Further, the user may start playback by selecting a play/pause control, or by selecting a media item in the playback queue, among other possible inputs.

As discussed above, a user of the MPS 100 may register the MPS 100 with one or more streaming media services by providing user account information. For instance, a user may provide their user accounts and passwords for one or more streaming media services via a controller interface of the MPS control app 761. After registering a given streaming media service, the user may browse or search for media provided by that service using the MPS control app 761. Further, the user may select media with the MPS control app 761 and play back that media on the playback devices 102a-o (FIG. 1A).

When executing, each streaming media service app 762 provide a respective interface to access streaming media provided by a respective streaming media service (also referred to as media content services). For instance, the SPOTIFY app provides an interface to search for and browse audio tracks available for streaming from the SPOTIFY streaming audio service. By selecting an audio track, a stream is initiated to the mobile device 704 via the network interface 724 (e.g., from the remote computing devices 106b (FIG. 1b)), which can be played back by the mobile device. Other commercially-available streaming media services include PANDORA, AMAZON MUSIC, APPLE MUSIC, TIDAL, PLAY MUSIC, DEEZER, and others. Before using the streaming media service app 762, a user will typically be required to log-in to the service using their user account information for the corresponding streaming media service.

The mobile device 704 can play back the audio track using the audio processing components 216, amplifiers 217, and/or speakers 218 or an externally-connected playback device, such as a speaker, headphones, or earbuds (e.g., connected via a 3.5 mm line-in or BLUETOOTH). In contrast to the playback devices 102 of the MPS 100, such externally-connected playback devices do not stream content directly from the remote computing devices 106b but instead receive audio from the mobile device 704. Some playback devices 102 may have a certain "portable" mode in which they are connected to the mobile device 704 via BLUETOOTH rather than to the LAN 111.

Further, some streaming media service app(s) 762 provide a protocol to allow a user to select a playback device (e.g., one of the playback devices 102) as the active playback device for playback. For instance, SPOTIFY CONNECT allows a user of the SPOTIFY streaming media service app 762 to select a playback device that supports SPOTIFY CONNECT (e.g., the playback devices 102). When such a playback device is selected, instead of streaming audio to the mobile device 704, the remote services 106b of the SPOTIFY streaming audio service stream the audio to the selected playback device for playback. The SPOTIFY streaming media service app 762 then acts as a remote to the active playback device.

If a SPOTIFY playback session is on-going on the mobile device 704, selecting another playback device allows the user to transition that session to that playback device. However, such transitions are internal to the SPOTIFY CONNECT platform and the devices that support that platform. Features supported by the native domain that are not part of the SPOTIFY CONNECT domain may be unavailable when working in the SPOTIFY connect domain.

The media player app(s) 763 provide playback features for local content in the memory 713 of the mobile device 704. Some media player app(s) 763 allow playback of content in network-attached storage (e.g., attached to the LAN 111 (FIG. 1B). Example media player app(s) 763 include APPLE iTUNES and VLC media player.

The software 714 further includes one or more streaming protocol services 764. Each streaming protocol service 764 is software that supports a streaming protocol, such as AIRPLAY 2 or GOOGLE CAST, which allows users to stream media from the mobile device 704 to a supported playback device. In some examples, the operating system 760 includes media playback controls, which include a streaming protocol control to select a target playback device. For instance, the iOS Control Center includes an AIRPLAY 2 control to select among compatible AIRPLAY 2 devices on the LAN 111 as streaming targets. As another example, the CHROME browser includes a GOOGLE CAST control select among compatible GOOGLE CAST devices on the LAN 111 as streaming targets. In other examples, certain apps, such as the streaming media service app(s) 762 and/or the media player apps 763 include streaming protocol support. For instance, the iTUNES app includes an AIRPLAY 2 control to select among compatible AIRPLAY 2 devices on the LAN 111 as streaming targets.

As further shown in FIG. 7A, the mobile device 704 also includes power components 727. The power components 727 include at least an external power source interface 728 and an internal power source 729 (e.g., one or more batteries) configured to power the mobile device 704 without a physical connection to an external power source. An external power source interface 728 may be coupled to a power source (not shown) via a USB cable or the like that physically connects the mobile device 704 to a charger and electrical outlet or some other external power source. The external power source interface 728 may be configured to facilitate charging the internal power source 729.

Figure 7B:
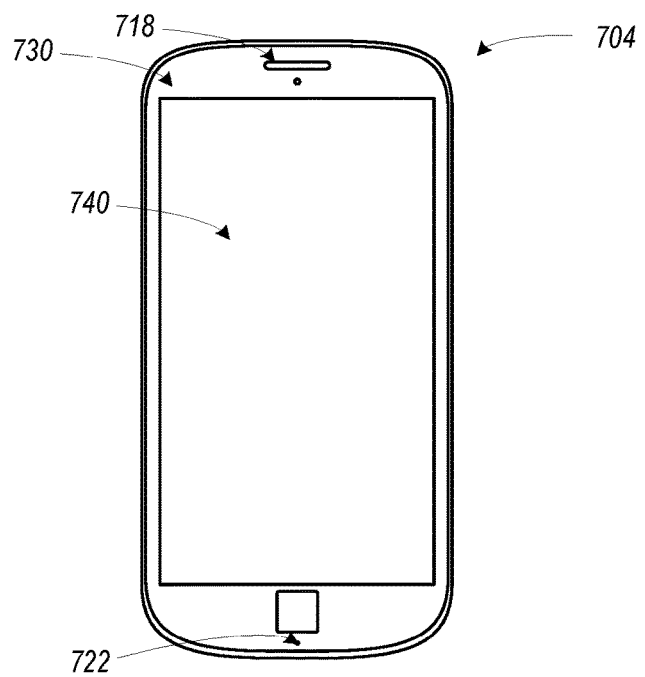
FIG. 7B is a diagram of the example mobile device, in accordance with aspects of the disclosure.

As an illustrative example, FIG. 7B shows a front view of the mobile device 704. As shown in FIG. 7B, the NMD 730 includes a housing 730. The housing 730 may carry one or more components shown in FIG. 7A. For instance, the user interface 740 includes a touch-sensitive graphical display carried on a front portion of the housing 730, as shown. Further, the housing 730 is also carrying a speaker 718 and a microphone 722 on its front portion.

IV. Example Playback Transition Scenarios

Figure 8A:
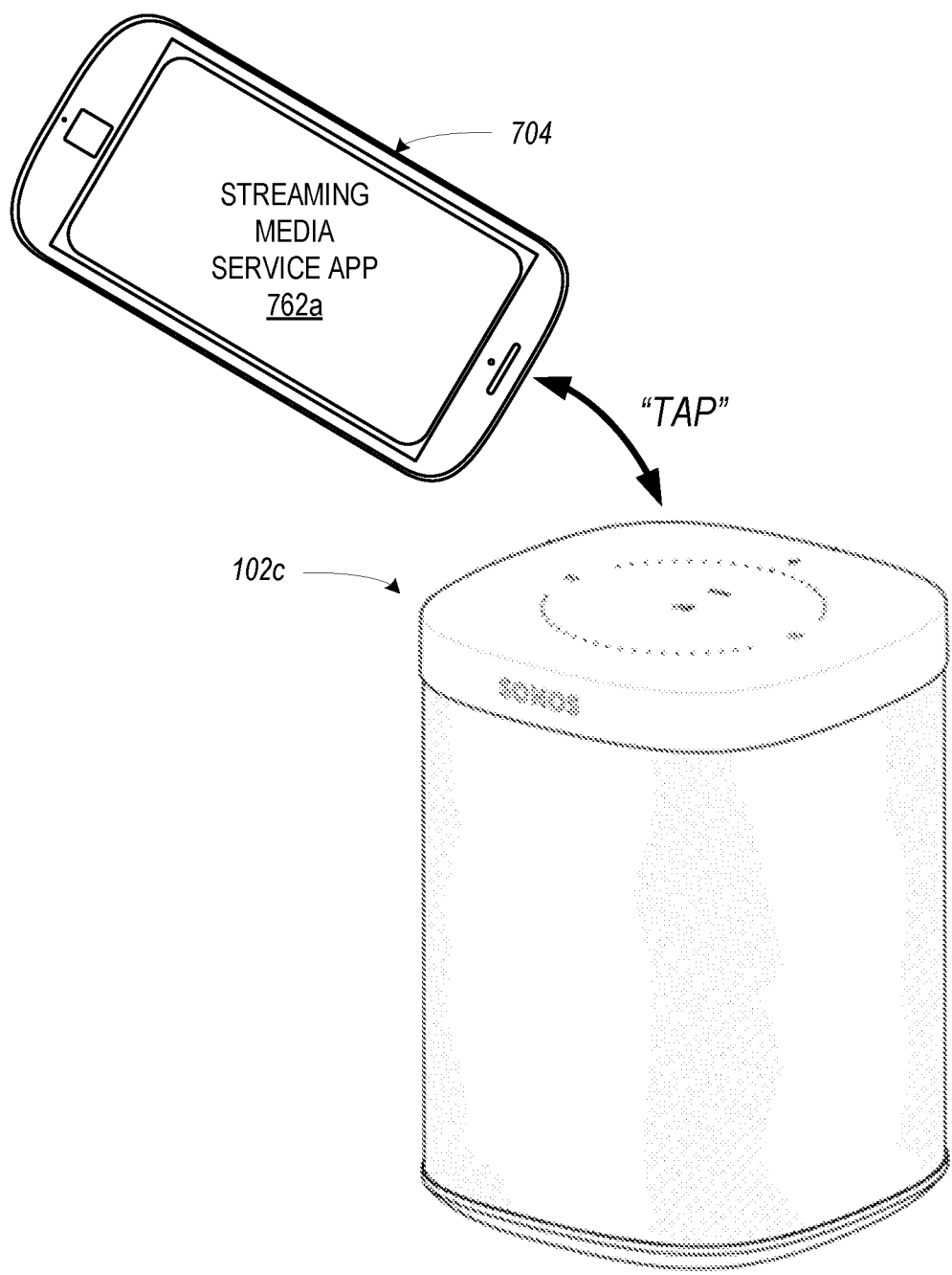
FIG. 8A is a schematic diagram illustrating a tap event between the example mobile device and the example playback device, in accordance with aspects of the disclosure.

FIG. 8A illustrates an exemplary first scenario in which a playback session transition between platforms is triggered via a "tap" event between the mobile device 704 and the playback device 102c (FIG. 1A). In the first scenario, a user may start a first playback session using a particular streaming media service app 762a corresponding to a particular streaming media service. In this first playback session, the streaming media service app 762a streams data representing audio content from one or more servers of the particular streaming media service (e.g., the computing devices 106b (FIG. 1B)) and plays back that audio content on the mobile device 704 (e.g., using the internal speakers 718 or an externally-connected speaker, earbuds, or headphones). In this example, the streaming media service app 762a is a first domain.

While the first playback session is on-going on the mobile device 704, the user may desire to transition playback from the mobile device 704 to the playback device 102c. For instance, the user was previously listening while "on-the-go" with their mobile device 704, and desires to transition to listening out-loud using the playback device 102c. If the streaming media service app 762a supports a protocol (such as SPOTIFY CONNECT) that allows changing the active playback device within the first domain, the user may opt to transition playback from the mobile device 704 to the playback device 102c using this protocol by selecting the playback device 102c as the active playback device within the streaming media service app 762a, which maintains the first playback session in the first domain, albeit on a different playback device.

However, since the first domain is non-native to the playback device 102c, the first domain might not support all features of the playback device 102c. For instance, the streaming media service app 762a might not support grouping multiple playback devices 102a-102o into synchrony groups. As such, the user may instead desire to transition playback from the first platform to a second platform native to the playback device 102c. As noted above in connection with FIG. 7A, the MPS control app 761 controls the playback device 102c in its native domain.

Accordingly, the user may bring the mobile device 704 into proximity of the playback device 102c to generate a tap event between the mobile device 704 and the playback device 102c, which causes a playback transition between a source platform (i.e., the streaming media service app 762) and a target platform (i.e., the MPS control app 761). In particular, while the first playback session is on-going via the streaming media service app 762a, the MPS control app 761 monitors for tap events. When the user bring the mobile device 704 into proximity of the playback device 102c to generate the tap event between the mobile device 704 and the playback device 102c, the MPS control app 761 detects this event and initiates the playback session transition from the source domain to the target domain (i.e., the native domain for the MPS 100).

In some implementations, the tap event is generated using a short-range wireless protocol such as BLUETOOTH LOW ENERGY (BLE). For example, the playback device 102c may emit a BLE beacon using a BLUETOOTH (802.15-compatible) interface of the wireless network interface 225 (FIG. 2A). This BLE beacon is detectable using a BLUETOOTH (802.15-compatible) interface of the wireless network interface 725 in the mobile device 704 (FIG. 7A). Detection of the low-energy BLE beacon at a certain threshold signal strength by the mobile device 704 indicates that the mobile device 704 is in close proximity to the playback device 102c (i.e., that a tap event is occurring).

Alternatively, the tap event is generated using near-field communication (NFC). The playback device 102c may have a NFC tag on its housing 230 (FIG. 2B) and the mobile device 704 may have an NFC reader. When the mobile device 704 is placed in proximity to the NFC tag on the playback device 102c, the NFC tag is read and a tap event is generated.

Since the MPS control app 761 is a different platform from the streaming media service app 762a, a playback session transition is effected by reproducing the first playback session in the source domain using a second playback session in the target domain. This reproduction results in an apparent playback session transition from the perspective of the user. To be able to reproduce the first playback session using a second playback session in the target domain, the MPS control app 761 needs to determine the target playback device(s) to start the second playback session on, as well as the currently playing audio content and play position within that content in the first domain.

Since a tap event involves two devices, the tap event itself facilities determining the source and target of the playback session transition. That is, when a tap event is generated, one of the two devices involved in the tap event is the source (i.e., the device with the first playback session, which is the mobile device 704 in the first scenario). The other device involved in the tap event is the target (i.e., the device without an on-going playback session, which is the playback device 102c). If both devices have active playback sessions, the mobile device 704 may determine the source and target based on a pre-determined setting or default.

In the first scenario, to identify the target device (i.e., the playback device 102c) to the source device (e.g., the mobile phone 704a), the tap event may involve transmitting an identifier that distinguishes the playback device 102c from the playback devices 102b-o. For instance, in the BLE example above, the BLE beacon emitted by the playback device 102c may include an identifier that distinguishes the playback device 102c from the playback devices 102a-b and 102d-o. Similarly, the NFC tag on the housing 230 of the playback device 102c may store such an identifier, which is read by the mobile device 704 during the tap event.

The MPS control app 761 may store or have access to data correlating this identifier to the playback device 102c. For instance, the memory 713 of the mobile phone 704 may include a table or other data structure correlating the identifier with configuration information of the playback device 102c, such as its internet protocol (IP) address, media access control (MAC) address, zone name, and the like. When the mobile device 704 receives the identifier of the playback device 102c, the MPS control app 761 may use this identifier to reference this configuration information.

As noted above, to be able to reproduce the first playback session using a second playback session in the target domain, the MPS control app 761 needs to determine the currently playing audio content and play position within that content in the first domain in addition to the target playback device(s). One possible source of this information is the servers of the particular streaming media service corresponding to the streaming media service app 762a (e.g. the computing devices 106b (FIG. 1B)). Another possible source is the streaming media service app 762a itself.

In some examples, the particular streaming media service may make playback session information available using an application programming interface (API). In such examples, the MPS control app 761 may query the playback session information using one or more function calls to the API. Then, playback session data may be transferred between the streaming media service app 762a and the MPS control app 761 using an inter-process communication mechanism implemented by the operating system 760. A possible issue with this approach is that it requires the streaming media service to make such an API available, and further the MPS control app 761 may need to be updated to maintain compatibility with the API.

Accordingly, the MPS control app 761 may instead access the playback session information from the servers of the particular streaming media service corresponding to the streaming media service app 762a. As noted above, to facilitate playback of streamed audio on the playback devices 102a-o, a user may register their MPS 100 (FIG. 1A) with their user account information for one or more streaming media services, including the particular streaming media service corresponding to the streaming media service app 762a. The MPS control app 761 may be authenticated with the streaming media services using this user account information, so that users of the MPS control app 761 can browse and/or search for media information from the streaming media services to play on the playback devices 102a-o. Further, streaming media services generally maintain a playback history of media items streamed by a given user account. As such, because the user has already provided the MPS control app 761 with the user account information for their subscribed streaming media services, the streaming media service app 762a may query the subscribed streaming media services for the audio track(s) that the user has streamed most recently. In other words, by virtue of users having registered their subscribed services with the MPS 100 (and thereby providing the MPS 100 with access to the user accounts of the various subscribed services), the MPS 100 and its associated devices (e.g., the mobile device executing the MPS control app 761 to function as a control device 104) are positioned to transfer playback sessions across platforms.

Since the first playback session is happening in a different domain, the MPS control app 761 may not know which streaming media service is involved in the first playback session. As such, to determine the playback session information, the MPS control app 761 may query multiple streaming audio services for playback history data associated with respective user accounts of the streaming audio services. Then, based on the queried playback history data, the MPS control app 761 may determine which streaming media service had an active playback session. For instance, the MPS control app 761 may look for the most recent time stamp associated with a streamed audio track. Various streaming media services may make available APIs to facilitate querying for playback history data.

Generally, APIs to interact with streaming media service servers are relatively available (as compared with APIs to access data via IPC) to facilitate access by third party playback devices to streaming media services. For example, SPOTIFY offers a Web API that includes functions allowing authorized third parties (i.e., those having a valid authorization token, such as the MPS control app 761) to query for user information. In particular, the Web API includes a function call to get a user's current playback information (curl-X GET "https://api.spotify.com/v1/me/player"-H "Authorization: Bearer {your access token}"), which returns structured data indicating which device is active (i.e., the source device), the currently playing track, the progress within the track, as well as other related information, such as an associated playlist that the currently playing track that the currently playing track is in (if any). Other streaming media services may make available APIs with equivalent or similar functions.

After getting the playback session information, the MPS control app 761 creates a second session in the target (native) domain. For instance, the MPS control app 761 may send instructions via the network interface 724 of the mobile device 704 to cause the playback device 102c to queue the currently playing audio track of the first playback session (and possibly additional audio tracks, such as those in a playlist with the currently playing audio track) in a queue in the memory 213 of the playback device 102c. As another example, the MPS control app 761 may send instructions to the remote computing devices 106c (e.g., one or more SONOS cloud servers) to cause the remote computing devices 106c to queue the currently playing audio track of the first playback session in a cloud queue associated with the playback device 102c. Additional details regarding cloud queues are described in U.S. patent application Ser. No. 14/616,310, filed Feb. 6, 2015, titled "Cloud Queue Access Control," and U.S. patent application Ser. No. 14/616,332, filed Feb. 6, 2015, titled "Cloud Queue Synchronization Protocol," which are incorporated herein by reference in their entirety. Other examples are possible as well.

Using the streaming media service APIs, the MPS control app 761 may finish the playback session transition by stopping the first playback session in the first domain. For instance, the MPS control app 761 may send instructions representing a function call to stop the session or pause playback, among other examples. Alternatively, the first playback session may stop automatically by the particular streaming media service when the second playback session is started in the target domain, since many streaming media services permit each user account to have only a single active stream.

In some cases, the MPS control app 761 may facilitate a fade-in to the second session and/or a fade-out from the first session. If the first session or the second session is in the native domain of the MPS control app 761, the MPS control app 761 may control the target playback device(s) directly to fade-in or fade-out. For playback sessions in a non-native domain, the MPS control app 761 may cause fade-in or fade-out using an API. Alternatively, such domains may automatically fade-in or fade-out, possibly based on user preferences configured in that domain.

For some types of content, the MPS control app 761 might not start the second playback session in the second domain at the same playback position as the first playback session in the first domain. For instance, for streaming radio and other types of live content, the MPS control app 761 may start playback in the second playback domain at the "live position." On the other hand, for offline content like podcasts or audio books, the MPS control app 761 will start the second playback session in the second domain at the same playback position as the first playback session in the first domain.

Figure 8B:
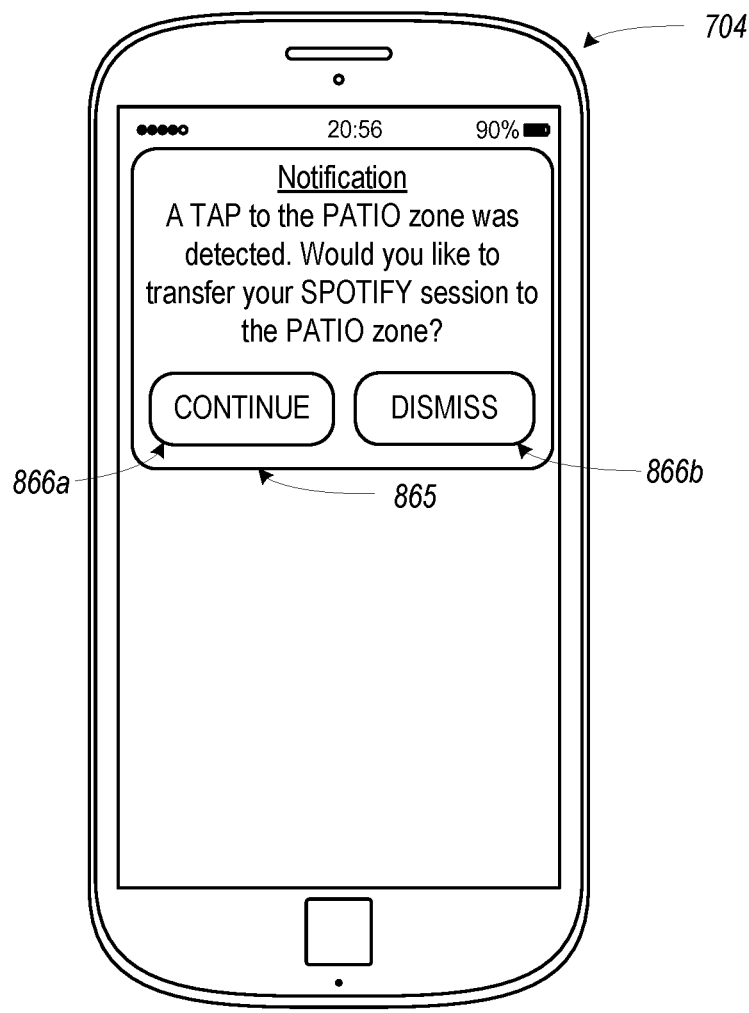
FIG. 8B illustrates an example notification on the example mobile device, in accordance with aspects of the disclosure.

In some implementations, after detecting a tap event, the MPS control app 761 may obtain confirmation that a playback session transition should be performed. FIG. 8B shows the mobile device 704 displaying a graphical notification 865. In some examples, the graphical notification 865 may be a feature of the operating system 760 (FIG. 7A) and may be displayed based on a function call to an API of the operating system 760. As such, the MPS control app 761 need not be active and may instead be executing in a background or suspend mode.

The graphical notification 865 includes a textual prompt indicating that the TAP event between the playback device 102c (in the patio 101i (FIG. 1A)) and the mobile device 704 was detected (FIG. 8A) and asking if the user would like to transfer the SPOTIFY session (e.g., the first playback session, initiated via the particular streaming media service application 762a. The graphical notification 865 further includes two selectable prompts 865a and 865b. The selectable prompt 865a, when selected, causes the MPS control app 761 to perform the playback session transition described in the first scenario. In contrast, when the selectable prompt 865b is selected, the MPS control app 761 foregoes performing the playback session transition.

Figure 8C:
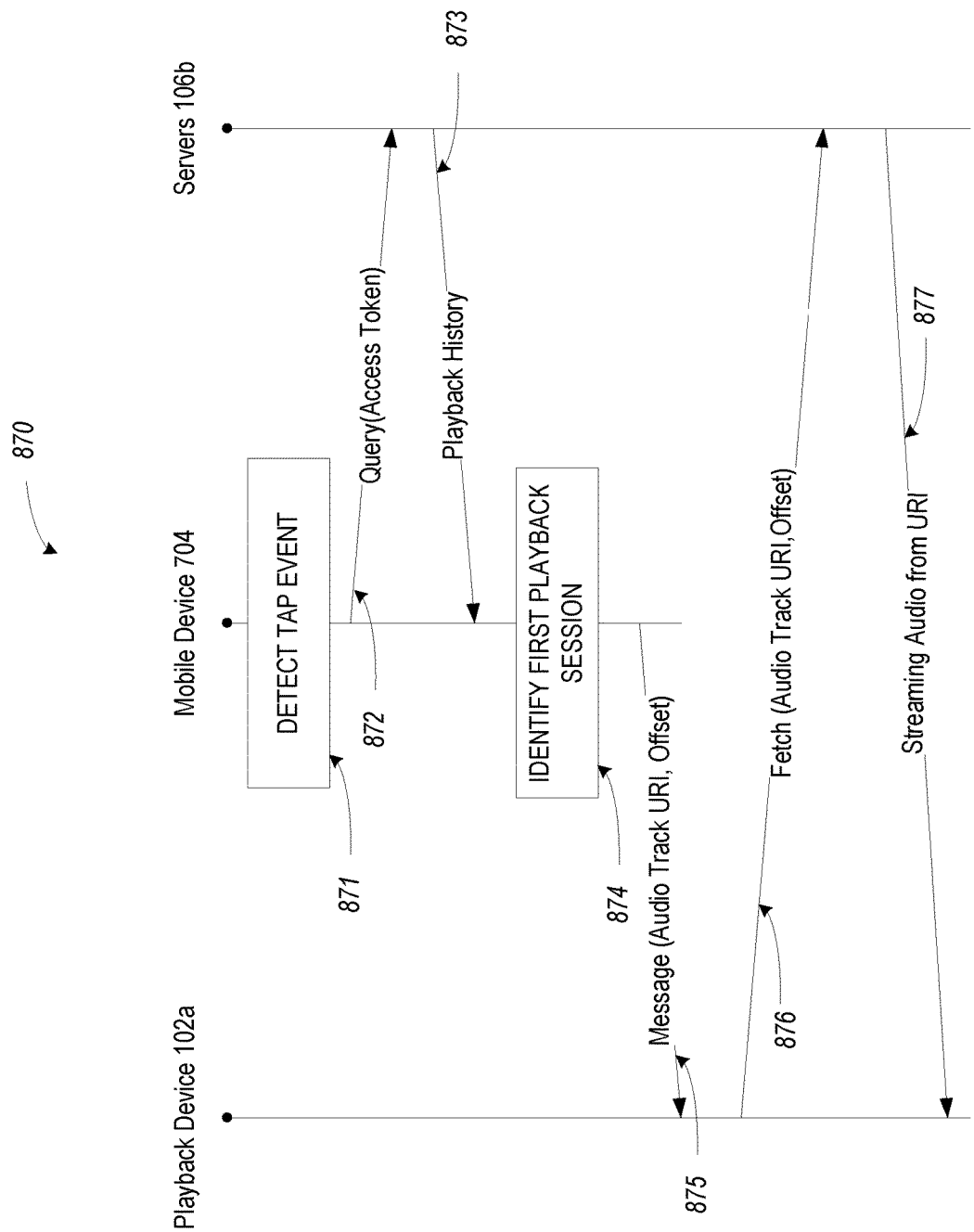
FIG. 8C is a schematic diagram illustrating an example playback session transition, in accordance with aspects of the disclosure.

FIG. 8C is a message flow diagram illustrating instructions exchanged between the mobile device 704, the playback device 102c, and the remote computing devices 106b (i.e., servers of one or more streaming audio services) during the playback session transition of the first scenario illustrated in FIGS. 8A and 8B. Such messages are representative and may include additional or fewer messages.

At 871, the MPS control app 761 executing on the mobile device 704 detects a tap event between the mobile device 704 and the playback device 702. To obtain playback session information, at 872, the MPS control app 761 queries the remote computing devices 106b of one or more streaming media services to obtain playback history information for respective user accounts. Each query may conform to an API provided by a respective streaming audio service to get access to playback history information. The queries may identify the user accounts of the various streaming media services that are registered with the MPS 100 (e.g., using respective authorization tokens, user names, etc.).

At 873, the remote computing devices 106b of the one or more streaming media services provide respective responses to the queries sent by the mobile device 704 indicating respective playback history information associated with the registered user account of each streaming media service. At 874, the MPS control app 761 identifies the first playback session based on the received playback history information.

In identifying the first playback session, the MPS control app 761 extracts or otherwise determines the currently playing audio track and offset within that track from the playback history information. If the mobile device 704 playback history information from multiple streaming audio services, the MPS control app 761 compares the playback history information to determine which user account was most recently active (i.e., that is currently active) to determine which streaming media service the user is currently using in the first playback session. Since the first playback session is occurring via the streaming media service app 762a of the particular streaming media service, the comparison of the playback history information indicates that the user's session is via the particular streaming media service.

At 875, to initiate a second session in the native domain, the MPS control app 761 sends a message to the playback device 102c that includes a command to start playing back the currently playing audio track (in the first session). The message also includes a uniform resource identifier identifying a source of the currently playing audio track (in the first session) at the servers 106b and an offset indicating the current play position within the currently playing audio track. If the currently playing audio track is part of a playlist, the MPS control app 761 may also send instructions to queue audio tracks of the playlist in a queue on the playback device 102c (or in a cloud queue associated with the playback device 102c).

At 876, based on receiving the message from the mobile device 704 with the audio track URI and the offset, the playback device 102c sends a fetch message to the remote computing device 106b to request a stream of the audio track from the remote computing device 106b. Based on this fetch message, at 877, the remote computing device 106b streams the audio track beginning at the offset to the playback device 102c for playback. By starting the stream to the playback device 102c, the remote computing device 106b automatically stop the first session using the streaming media service app 762a because the user account of the particular streaming media service is permitted a single concurrent stream.

In a variation of the first scenario, the user may start a playback session using a particular streaming media service app 762a on the mobile device 704 but select another playback device (e.g., the playback device 102b) as the active playback device using a protocol such as SPOTIFY CONNECT. As noted above, in such cases, the particular streaming media service app 762a functions as a remote control for the playback device 102b. In example implementations, a tap event between the mobile device 704 and the playback device 102c may similarly trigger a playback session transition. Since the user account registered with the streaming media service app 762a is still being utilized in the playback session on the playback device 102b, if the MPS control app 761 queries the particular streaming media service for currently playing media, the query will return playback session information associated with the playback session on the playback device 102b. The MPS control app 761 can then create a second session in the native domain on the playback device 102c.

In another variation of the first scenario, the user may start a first playback session in the native domain on the playback device 102c using the MPS control app 761 and then decide to transition to a second domain using the tap event illustrated in FIG. 8A. Since the MPS control app 761 already has the first playback session info (currently playing track, offset, playlist, etc.), the MPS control app 761 can transition to a second playback session in a second domain by instructing an entity in the second domain to create the second playback session using the first playback session info (and then end the first playback session). For instance, to start a second playback session in the SPOTIFY domain, the MPS control app 761 may call into the SPOTIFY Web API with one or more functions to create a new session with the currently playing track and to seek to the current offset within that track.

In an exemplary second scenario, a user may start a first playback session that utilizes the streaming protocol service to stream audio content from a first device to a second device. FIG. 9A illustrates a first playback session that utilizes the streaming protocol service 764 (FIG. 7A) to stream audio content between the mobile device 704 and the playback device 702c. In FIG. 9A, the audio content is streamed using the LAN 111 (FIG. 1B).

The streaming protocol service 764 defines a "sender" that streams audio content and a "receiver" that receives the audio content from the sender over the LAN 111 (FIG. 1B) and plays the audio content back. These types of streams may be streams provided using a real-time streaming protocol (e.g., RTSP). To support the streaming protocol service 764, each of the sender and the receiver include hardware and/or software configured to send and/or receive data according to the streaming protocol service 764. As noted above, examples of the streaming protocol service include APPLE AIRPLAY2 and GOOGLE CAST. In the FIG. 9A example, the mobile device 704 and the playback device 102a are operating as the sender and the receiver, respectively, of the streaming protocol service 764.

Generally, the streaming protocol service 764 allows a user to stream any audio from the sender to the receiver. For instance, in the FIG. 9A example, the audio source is a media player app 763a, which may play local audio content from the memory 713 (FIG. 7A), or from a network source on the LAN 111 or the networks 107 (FIG. 1B). In further examples, the audio source may be one of the streaming media service app(s) 762 (FIG. 7A), which may stream audio from the remote computing devices 106b (FIG. 1B).

Notably, the native domain of the MPS 100 may provide similar or equivalent features as the streaming protocol service 764, albeit on a different platform than the streaming protocol service 764. In particular, the native domain may similarly provide a native domain streaming protocol. Using the native domain streaming protocol, the MPS control app 761 may stream audio to the playback devices 102 of the MPS 100. Alternatively, as described above, the MPS control app 761 may control the playback devices 102 to stream audio directly from an audio source, rather than having the mobile device 704 function as an intermediary. While the playback device 102a is part of the first playback session in the domain of the streaming protocol service 764, the streaming protocol service 764 may functionally "step-in" or replace the native domain features, which are then not in use.

For various reasons, a user may desire to transition the first playback session in the domain of the streaming protocol service 764 to the native domain of the MPS 100. For instance, as noted above, since the streaming protocol service 764 is controlling the playback device 102a during the first playback session, certain native domain features may be unavailable. To regain access to those native domain features (without disrupting playback), a user may desire to transition the first playback session in the domain of the streaming protocol service 764 to the native domain of the MPS 100.

Figure 9B:
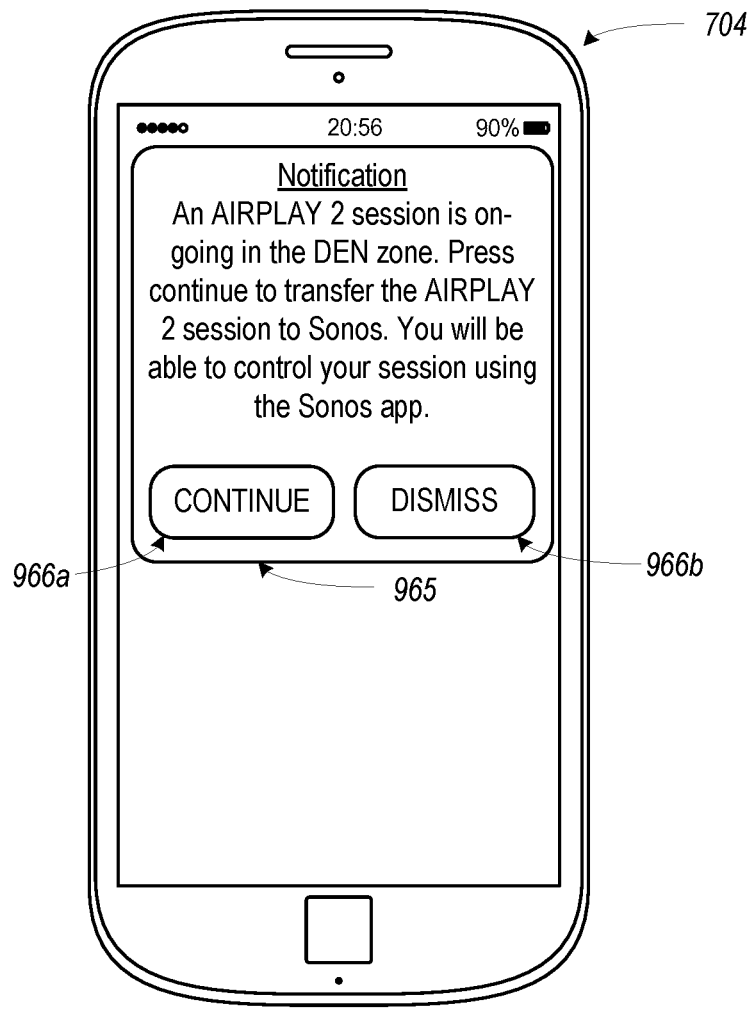
FIG. 9B illustrates an example notification on the example mobile device, in accordance with aspects of the disclosure.

In some examples, a user may trigger a playback session transition from the domain of the streaming protocol service 764 using user input. FIG. 9B shows the mobile device 704 displaying a graphical notification 965. Similar to the graphical notification 865, the graphical notification 865 may be a feature of the operating system 760 (FIG. 7A) and may be displayed based on a function call to an API of the operating system 760. Other triggers, such as the tap event, may be implemented as well.

The graphical notification 965 includes a textual prompt indicating that the first playback session in the domain of the streaming protocol service 764 (e.g., AIRPLAY 2 session) is on-going. The textual prompt of the graphical notification 965 further asks if the user would like to transfer the AIRPLAY 2 session to the native domain of the MPS 100 (e.g., SONOS). The graphical notification 965 further includes two selectable prompts 865a and 865b. The selectable prompt 965a, when selected, triggers the MPS control app 761 to transition first playback session to the native domain of the MPS 100. In contrast, when selected, the selectable prompt 965b foregoes performing the playback session transition.

Since the first playback session in the domain of the streaming protocol service 764 is taking place on the playback device 102a, which is part of the MPS 100, the MPS control app 761 may get playback session information for the first playback session from the playback device 102a. As discussed in connection with FIG. 2A, the memory 213 of each playback devices 102 may maintain state variables indicating the current state of the playback device(s) 102, including current playing audio tracks, offsets, and the like. These state variables kept synchronized across the MPS 100, including in the control devices 104 (i.e., the mobile phone 704 executing the MPS control app 761). Using this data, the MPS control app 761 may start a second playback session.

To complete the playback session transition, the first playback session is stopped. In some implementations, the streaming protocol service 764 may automatically stop the first playback session when the MPS control app 761 takes over control of the playback device 102a by starting the second playback session. Alternatively or additionally, if the audio source is a streaming audio service, the streaming audio service may automatically stop the first playback session when the playback device 102a starts streaming in the second playback session due to limitations in the number of concurrent audio streams. Yet further, the MPS control app 761 may send instructions to the streaming protocol service 764 to stop the first playback session, perhaps using a function call of an API of the streaming protocol service 764.

In a variation of the second scenario, a user may desire to transition a native domain playback session to the domain of the streaming protocol service 764. For instance, the user may have devices from multiple manufactures, which each support the streaming protocol service 764, but have respective native domains. As such, to transition a playback session from one or more playback devices 102 of the MPS 100 to a third-party playback device, the user may desire to transition a native domain playback session to the domain of the streaming protocol service 764

In this variation, since the first playback session in the native domain of the MPS 100, the MPS control app 761 already maintains or has access to playback session information for the first playback session from the playback device 102a. To start a second playback session in the domain of the streaming protocol service 764, the MPS control app 761 may send instructions to the streaming protocol service 764. The instructions may be internal to the mobile device 704 (e.g., via an IPC mechanism) or via a server of the streaming protocol service 764 and/or the MPS 100 (e.g., the computing device 106c (FIG. 1B)).

In another variation of the second scenario, a user may desire to transition a playback session in the domain of the streaming protocol service 764 to a domain of a streaming media service. For instance, a user may be playing a particular audio track from a network-attached storage on the LAN 111 on the playback device 102a in a first playback session in the domain of the streaming protocol service 764. To take this playback session on-the-go, the user may desire to transition the first playback session to play back on the mobile device 704 using the streaming media service app 762a.

Since this playback session in the domain of the streaming protocol service 764 is taking place on the playback device 102a, which is part of the MPS 100, the MPS control app 761 may get playback session information for the first playback session from the playback device 102a. The MPS control app 761 may then start a playback session in the domain of the particular streaming media service using an API of the streaming media service app 762a. For instance, the SPOTIFY Web API includes a function called find-and-play, which allows searching for and playing an audio track based on a uniform resource identifier and/or metadata.

In some instances, a user may desire to take a native domain playback session or a streaming protocol service 764 occurring on a playback device 102 "on-the-go." When these domains utilize wireless local area networks to stream audio content, such domains are generally unavailable when the user is outside of the range of the LAN 111. Accordingly, the user may desire to transition a native domain playback session or a streaming protocol service 764 occurring on a playback device 102 to a playback session on the mobile device 704, which the user can take with them and listen using speakers 718 and/or an externally-connected speaker, headphones, or earbuds connected via BLUETOOTH or line-in.

FIG. 10 illustrates an exemplary third scenario in which a playback session transition between platforms is triggered via a network disconnection event on the mobile device 704. In particular, a user may start a native domain playback session on the playback device 102g that involves playing back a particular audio track from a particular streaming audio service. To play the audio track, the playback device 102g streams data representing the particular audio track from the computing devices 106b of the particular streaming audio service via the router 109 and the LAN 111.

When the user carries the mobile device 704 away from the home environment including the MPS 100 (FIGS. 1A and 1B), the mobile device 704 disconnects from the LAN 111 when the LAN 111 becomes out-of-range. The MPS control app 761 (or other software, such as a background process or agent) may detect this network disconnection event. Since this network disconnection event indicates that the user is leaving the home environment, the MPS control app 761 may facilitate a playback session transition from the playback device 102g and to the mobile device 704.

When the mobile device 704 detects the network disconnection event, the MPS control app 761 may obtain confirmation that a playback session transition should be performed. FIG. 10 further shows the mobile device 704 displaying a graphical notification 1065. The graphical notification 1065 includes a textual prompt indicating that the user is leaving the LAN 111 and asking if the user would like to transfer the native domain playback session to the mobile device 704. The graphical notification 1065 further includes two selectable prompts 1066a and 1066b. The selectable prompt 1066a, when selected, causes the MPS control app 761 to perform a playback session transition from the native domain to a domain available locally on the mobile device 704. In contrast, when the selectable prompt 1065b is selected, the MPS control app 761 foregoes performing the playback session transition.

Since, in the third scenario, the playback device 102g was playing back the particular audio track from a particular streaming audio service, the MPS control app 761 may create a second playback session in the domain of the particular streaming audio service. As described above in connection with other examples, exemplary streaming audio services provide respective APIs allowing a third-party, such as the MPS control app 761, to create playback session in their domain. For instance, a function call to SPOTIFY API can create a SPOTIFY domain playback session in the SPOTIFY app (known as a SPOTIFY Deep Link). Further, since the first playback session is in the native domain, the MPS control app 761 maintains or has access to data indicating that the playback device 102g was playing back the particular audio track from a particular streaming audio service. After creating the second playback session, the mobile device 704 streams the audio content via the networks 107 from the remote computing device 106b, as shown in FIG. 10.

In a variation of the third scenario in FIG. 10, a playback session transition may be triggered by a network connection event. For instance, when the user returns home with the mobile device 704 and reconnects to the LAN 111, the mobile device 704 may detect this network connection event and trigger a playback session transition from a domain local to the mobile device 704 (e.g., the domain of the particular streaming service) to a domain that can be used to stream audio content to one or more of the playback devices 102 (e.g., the native domain or the streaming protocol service 764 domain). Then the user can select the playback device 102 to continue the playback session on (e.g., via user input or a TAP event (FIG. 8A)).

The MPS control app 761 may detect a network connection event using various techniques. In some examples, the MPS control app 761 stores the service set ID (SSID) of the LAN 111 in local data storage or in the cloud as the network interconnecting the media playback system 100. Then, the MPS control app 761 may query or otherwise obtain the current network status from the operating system 760. In further examples, when the mobile device 704 connects to the LAN 111, the MPS control app 761 may send out a broadcast discovery message on the LAN 111, which may cause the playback devices 102 to respond with one or more messages that indicate to the MPS control app 761 that mobile device 704 is connected to the LAN 111. Alternatively, the playback devices 102 may periodically transmit broadcast discovery messages on the LAN 111, which the mobile device 704 may receive once connected to the LAN 111. Other network connection techniques involve local discovery using BLUETOOTH (e.g., a BLE connection) or one or more audio tones (e.g., an ultrasonic tone). Further examples may use a combination of such techniques, or any other suitable technique.

In another variation of the third scenario in FIG. 10, as an alternative to triggering a playback session transition based on a network disconnection event when the user leaves the range of the LAN 111, the playback session transition may be triggered based on a network connection event. For instance, when the mobile device 704 connects via BLUETOOTH to a car stereo receiver in the user's automobile, the mobile device 704 may trigger the playback session transition of the third scenario. Alternatively, some cars include an infotainment system that provides a Wi-Fi hotspot using a cellular modem. Connecting to such a Wi-Fi hotspot may trigger a playback session transition.

In various examples, the MPS control app 761 may detect a network connection event or disconnection event based on data from the network interface 724. For instance, when the network interface 724 connects to or disconnects from a network, the network interface 724 may generate an interrupt that notifies the operating system 760 of network connection or disconnection. The MPS control app 761 (directly or via a background process) may monitor network connection status information maintained by the operating system 760.

In practice, multiple playback session transitions across domains using various triggers may facilitate a user maintaining a playback session on various devices as they go about their day. For instance, a user may start a first playback session in the native domain on the playback device 102*h* in the master bathroom 101*a* while getting ready. After the user leaves the house on foot for work, a network disconnection event triggers a playback session transition (FIG. 10), which creates a second playback session in a domain of a particular streaming media service that reproduces the first playback session in the native domain on the playback device 102*h* in the master bathroom 101*a*. From the perspective of the user, the playback session has transitioned seamlessly to the mobile device 704 to facilitate listening via earbuds or headphones during the morning commute.

After work, the user returns home and triggers a playback session transition back to the native domain via a tap event on the playback device 102*i* in the Kitchen 101*h*. This transition creates a third playback session, reproducing the second playback session in the domain of the particular streaming media service in the native domain. After dinner, the user receives an invite from a friend to visit. Upon turning on his car, a network connection event triggers another playback session transition, which creates a fourth playback session that reproduces the third playback session in the domain of the particular streaming media service.

After arriving at the friend's house, the user desires to share with the friend some of the audio tracks that the user has been enjoying throughout the day. Since the friend has a third-party playback device that supports the streaming protocol service 764, the user connects to the friend's Wi-Fi network using the mobile device 704 and provides user input to trigger a playback session transition to the domain of the streaming protocol service 764 (FIG. 9B). This playback session transition creates a fifth playback session, which reproduces the fourth playback session in the domain of the streaming protocol service 764. The user then selects the third-party playback device as the active playback device (i.e., the receiver) and the mobile device 704 becomes the sender.

Upon returning home, the user triggers a playback session transition back to the native domain via a tap event to on the playback device 102*g* in the Master Bedroom 101*b*. This transition creates a sixth playback session, reproducing the fifth playback session in the domain of the streaming protocol service 764 in the native domain.

As described in connection with FIGS. 1A and 1B, the MPS 100 may include one or more portable playback devices, such as the headphones 102*o*. Such portable devices may operate in one of two modes. In a first mode, the headphones 102*o* connect to the LAN 111 and operate similarly to the other playback devices 102. In as second mode, the headphones 102*o* connect directly to a computing device (e.g., the mobile device 704) using BLUETOOTH.

A portable playback device, such as the headphones 102*o*, may be a source or target for a playback session transition. For instance, a user may use a tap event between the mobile phone 704 and the headphones 102*o* to trigger a playback session transition. Moreover, since the headphones 102*o* are portable, the headphones 102*o* may trigger playback session transitions in a similar manner as the mobile device 704. For instance, a network connection or disconnection event on the headphones 102*o* may trigger a playback session transition. Further, a tap event between the headphones 102*o* and another one of the portable playback devices 102 may trigger a playback session transition between those devices.

V. Example Playback Session Transition Techniques

Figure 11:
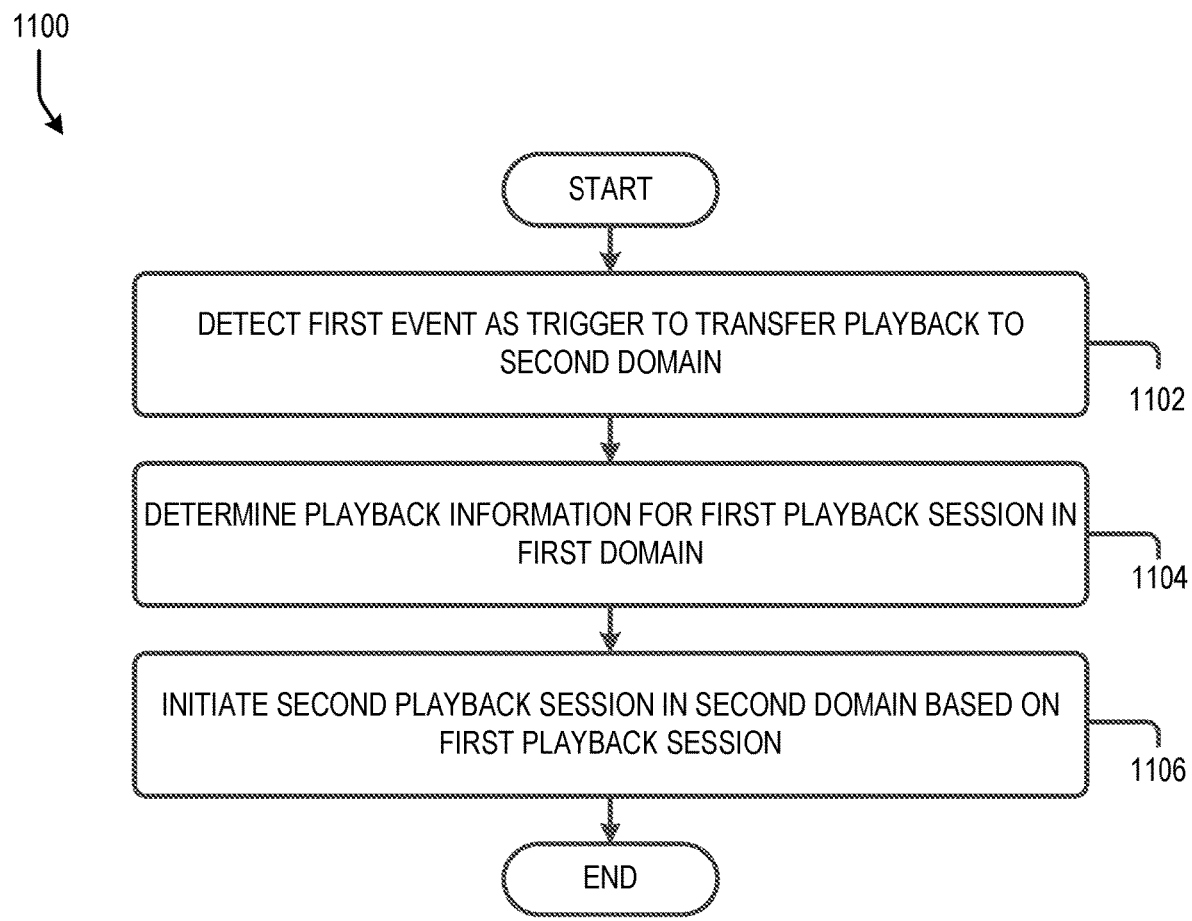
FIG. 11 is a flow diagram of an example method to perform a playback session transition in accordance with aspects of the disclosure.

FIG. 11 is a flow diagram showing an example method 1100 to facilitate a playback session transition between domains. The method 1100 may be performed by a networked microphone device, such as the mobile device 704 (FIG. 7A). Alternatively, the method 1100 may be performed by any suitable device or by a system of devices, such as the playback devices 102, NMDs 103, control devices 104, computing devices 105, computing devices 106, and/or mobile device 704.

At block 1102, the method 1100 includes detecting a first event as a trigger to transfer playback to a second domain. For example, while a first playback device is playing back audio content during a first playback session in a first domain, the mobile device 704 (FIG. 7A) may detect a first event which is configured as a trigger to transfer playback to a second domain on a second playback device. Example trigger events include a tap event (FIG. 8A), a particular user input (FIG. 9B), and a network connection or disconnection event (FIG. 10), as well as other suitable events. The first playback device may be one of the playback device(s) 102 of the MPS 100 or a third-party playback device.

At block 1104, the method 1100 includes determining playback information for a first playback session in a first domain. For instance, in response to detecting the first event, the MPS control app 761 on the mobile device 704 may determine that the first playback device was playing particular audio content in the first playback session and that the first playback device was at a given playback position in the particular audio content.

In some instances, the first playback device may be playing audio content from a network location at one or more servers of a particular streaming audio service. If the first domain is a native domain, the MPS control app 761 may already have the playback information (e.g., from the servers or the playback device). If the first domain is a non-native domain, the MPS control app 761 may query multiple streaming audio services for playback history data associated with respective user accounts of the streaming audio services. The MPS control app 761 may be authenticated with the multiple streaming audio services as these user accounts of the streaming audio services are registered with the MPS 100.

Based on the queried playback history data, the MPS control app 761 may determine that the particular audio content was being played back when the first event was detected. In some cases, the particular audio content is associated with a particular identifier identifying the network location at the one or more servers of the particular streaming audio service. For instance, exemplary streaming audio services may assign each track a uniform resource identifier (URI) identifying the network location at the one or more servers of the particular streaming audio service.

At block 1106, the method 1100 includes initiating a second playback session in a second domain based on the first playback session in the first domain. For example, the mobile device 704 may send, via a network interface, instructions to initiate a second playback session in the second domain to play back the particular audio content on the second playback device. The second playback device may be one of the playback device(s) 102 of the MPS 100 or a third-party playback device.

The instructions may indicate the network location at the one or more servers of the particular streaming audio service and an offset in the particular audio content representing the given playback position, which allows the second playback device to reproduce the first playback session in the second domain. If the particular audio content is associated with a particular identifier identifying the network location at the one or more servers of the particular streaming audio service, the instructions may further indicate the particular identifier.

In some examples, the first domain is a wireless streaming protocol defining a sender and a receiver connected via a local area network (LAN), such as the streaming protocol service 764 (FIG. 7A). In such examples, the mobile device 704 may be configured as the sender to configure the first playback device as the receiver to stream the particular audio content from the network location at the one or more servers during the playback session in the first domain. Alternatively, the second domain may be the wireless streaming protocol.

Further, in such examples, the second domain may be a native control protocol of the MPS 100. In such examples, sending the instructions to initiate the playback session in the second domain includes a native control application executing on the mobile device 704 (i.e., the MPS control app 761) sending instructions according to the native control protocol to (i) populate a queue associated with the second playback device with the particular audio content and (ii) start playback at the offset. Alternatively, the first domain may be the native control protocol of the MPS 100.

Alternatively, the second domain may be a streaming audio service control protocol and a streaming audio service application (e.g., the streaming media service app(s) 762*a*) (FIG. 8A). In such examples, sending the instructions to initiate the playback session in the second domain may include the streaming audio service control application 762*a* executing on the mobile device 704 sending instructions according to the streaming audio service control protocol to the second playback device to play back the particular audio content starting at the offset. The mobile device 704 may send the instructions directly (e.g., over the LAN 111) or via one or more servers (e.g., the remote computing devices 106*b*A) over the LAN 111 and the networks 107.

Yet further, the second playback device may be an 802.15-compatible (BLUETOOTH) portable playback device, headphones, earbuds, car stereo receiver, or other playback device. In such examples, sending the instructions to initiate the playback session in the second domain may include the native control application (i.e., the MPS control app 761) executing on the mobile device initiating the playback session in the second domain locally on the mobile device 704. The MPS control app 761 may send, via an 802.15-compatible network interface, a data stream representing the particular audio content. The data stream may begin at the offset in the particular audio content. Then, receiving the data stream causes the second playback device to begin playback of the particular audio content at the offset.

In some examples, a playback session transition may involve the first event and a second event. For example, detecting the first event may include detecting that the mobile device has left the proximity of the first playback device (e.g., via a network disconnection event (FIG. 10)). The mobile device 704 may then detect a second event corresponding to a trigger to initiate the playback session in the second domain. Detecting the second event may involve detecting that the mobile device has entered the proximity of the second playback device (e.g., via a network connection event, such as forming an 802.15 connection to a car stereo receiver or a wearable device). In such examples, sending the instructions to initiate the playback session in the second domain may involve sending the instructions to initiate the playback session in the second domain in response to detecting the second event.

In other examples, the first domain includes a streaming audio service control protocol and a streaming audio service application (e.g., the streaming media service app(s) 762*a*) (FIG. 8A). To initiate the first playback session on the first playback device, the streaming media service app 762*a* may send instructions according to the streaming audio service control protocol to initiate the first playback session in the first domain on the first playback device.

In such an example, second domain may be the native control protocol of the MPS 100. Then, sending the instructions to initiate the playback session in the second domain may include a native control application (i.e., the MPS control app 761) executing on the mobile device 704 sending instructions according to the native control protocol to (i) populate a queue associated with the second playback device with the particular audio content and (ii) start playback at the offset. As another example, sending the instructions to initiate the playback session in the second domain may include the native control application associated with a particular user account of a native cloud service executing on the mobile device sending, to one or more servers of the native cloud service (e.g., the remote computing devices 106*c*), instructions according to the native control protocol (i) populate a cloud queue associated with the second playback device with the particular audio content and (ii) start playback on the second playback device at the offset.

Figure 12:
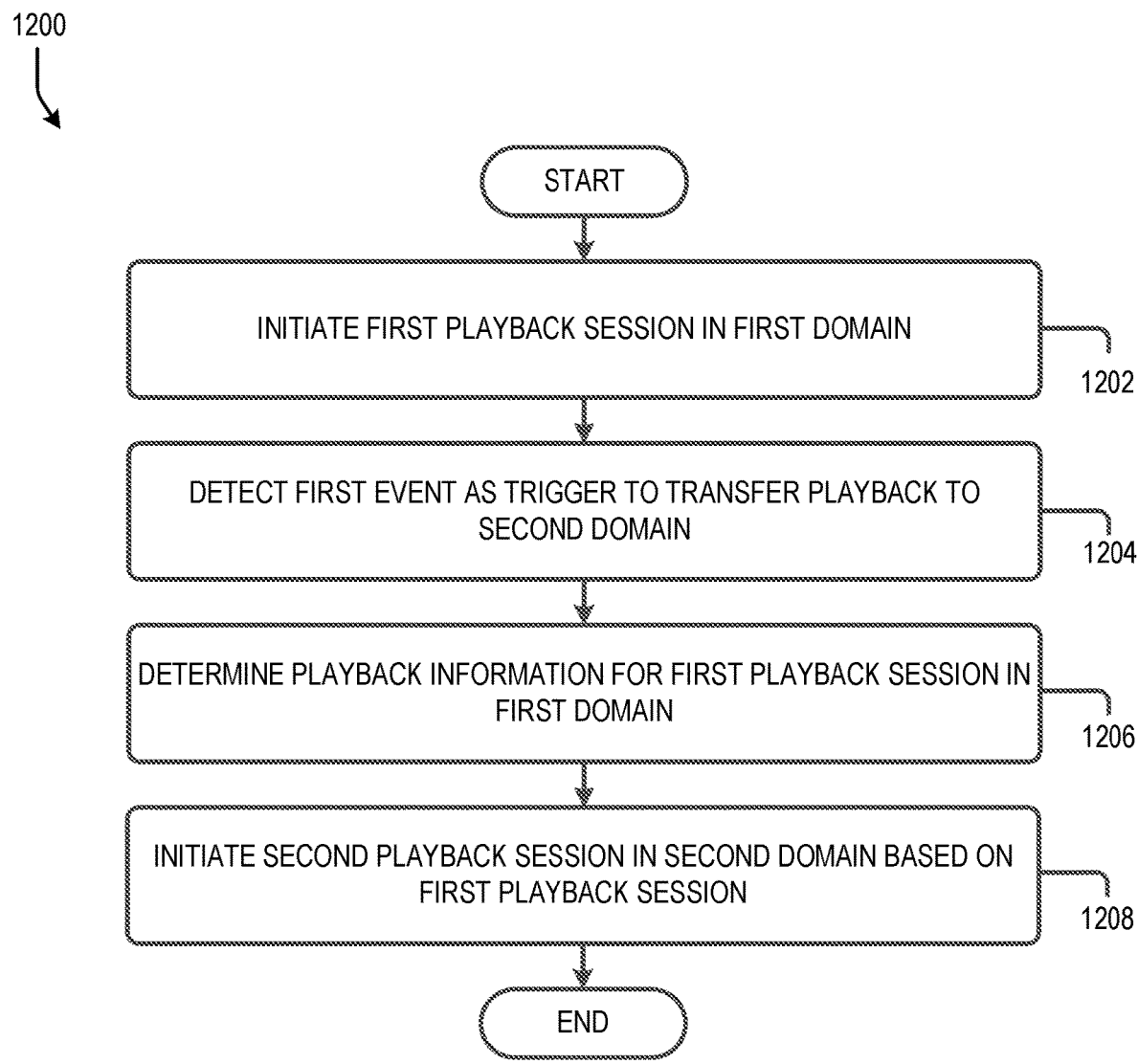
FIG. 12 is a flow diagram of an example method to perform a playback session transition in accordance with aspects of the disclosure.

FIG. 12 is a flow diagram showing an example method 1200 to facilitate a playback session transition between domains. The method 1200 may be performed by a networked microphone device, such as the mobile device 704 (FIG. 7A). Alternatively, the method 1200 may be performed by any suitable device or by a system of devices, such as the playback devices 102, NMDs 103, control devices 104, computing devices 105, computing devices 106, and/or mobile device 704.

At block 1202, the method 1200 includes initiating a first playback session in a first domain. For instance, the MPS control app 761 on the mobile device 704 may send, via a network interface, instructions to initiate a playback session in a native domain of the MPS 100 to play back particular audio content on a first playback device 102 of the MPS 100. Alternatively, the first playback session may be initiated in the streaming media service domain or the streaming protocol service domain, among other possible examples.

At block 1204, the method 1200 includes detecting a first event as a trigger to transfer playback to a second domain. For example, while the first playback device is playing back audio content during the first playback session in a first domain, the mobile device 704 (FIG. 7A) may detect a first event which is configured as a trigger to transfer playback to a second domain on a second playback device. Example trigger events include a tap event (FIG. 8A), a particular user input (FIG. 9B), and a network connection or disconnection event (FIG. 10), as well as other suitable events.

At block 1206, the method 1200 includes determining playback information for the first playback session in the first domain. For instance, in response to detecting the first event, the MPS control app 761 on the mobile device 704 may determine that the first playback device was playing particular audio content in the first playback session and that the first playback device was at a given playback position in the particular audio content. As noted above, If the first domain is a native domain, the MPS control app 761 may already have the playback information (e.g., from the servers or the playback device). Such playback information may be stored or maintained in one or more state variables in memory of the playback devices 102 and/or the mobile device 704.

At block 1208, the method 1200 includes initiating a second playback session in a second domain based on the first playback session in the first domain. For example, the mobile device 704 may send, via a network interface, instructions to initiate a second playback session in the second domain to play back the particular audio content on the second playback device. The second playback device may be one of the playback device(s) 102 of the MPS 100 or a third-party playback device.

When the first domain is a native domain, to transfer out of the native domain, the MPS control app 761 may send the instructions according to an API conforming to the second domain. In particular, the MPS control app 761 on the mobile device 704 may send, via a network interface to the second playback device, instructions according to an application programming interface (API) of the second domain, the instructions causing the second playback device to initiate the playback session in the second domain to play back the particular audio content on the second playback device. As another example, the MPS control app 761 on the mobile device 704 may send, via a network interface to one or more cloud servers associated with the second domain, instructions to initiate the playback session in the second domain to play back the particular audio content on the second playback device. The cloud servers may be servers of a streaming audio service (e.g., the remote computing device(s) 106b), among other examples.

Other example techniques include sending, via an inter-process communication interface to an application associated with the second domain, instructions to initiate the playback session in the second domain to play back the particular audio content on the second playback device.

Conclusion

The description above discloses, among other things, various example systems, methods, apparatus, and articles of manufacture including, among other components, firmware and/or software executed on hardware. It is understood that such examples are merely illustrative and should not be considered as limiting. For example, it is contemplated that any or all of the firmware, hardware, and/or software aspects or components can be embodied exclusively in hardware, exclusively in software, exclusively in firmware, or in any combination of hardware, software, and/or firmware. Accordingly, the examples provided are not the only way(s) to implement such systems, methods, apparatus, and/or articles of manufacture.

The specification is presented largely in terms of illustrative environments, systems, procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Numerous specific details are set forth to provide a thorough understanding of the present disclosure. However, it is understood to those skilled in the art that certain embodiments of the present disclosure can be practiced without certain, specific details. In other instances, well known methods, procedures, components, and circuitry have not been described in detail to avoid unnecessarily obscuring aspects of the embodiments. Accordingly, the scope of the present disclosure is defined by the appended claims rather than the forgoing description of embodiments.

When any of the appended claims are read to cover a purely software and/or firmware implementation, at least one of the elements in at least one example is hereby expressly defined to include a tangible, non-transitory medium such as a memory, DVD, CD, Blu-ray, and so on, storing the software and/or firmware.

The present technology is illustrated, for example, according to various aspects described below. Various examples of aspects of the present technology are described as numbered examples (1, 2, 3, etc.) for convenience. These are provided as examples and do not limit the present technology. It is noted that any of the dependent examples may be combined in any combination, and placed into a respective independent example. The other examples can be presented in a similar manner.

Example 1: A method comprising: while a first playback device is playing back audio content during a first playback session in a first domain, detecting a first event, the first event configured as a trigger to transfer playback to a second domain on a second playback device; in response to detecting the first event, determining that the first playback device was playing particular audio content from a network location at one or more servers of a particular streaming audio service in the first playback session and that the first playback device was at a given playback position in the particular audio content; and sending, via a network interface, instructions to initiate a second playback session in the second domain to play back the particular audio content on the second playback device, the instructions indicating the network location at the one or more servers of the particular streaming audio service and an offset in the particular audio content representing the given playback position.

Example 2: The method of Example 1, wherein determining that the first playback device was playing particular audio content from one or more servers of the particular streaming audio service comprises: querying multiple streaming audio services for playback history data associated with respective user accounts of the streaming audio services, wherein the user accounts of the streaming audio services are registered with a media playback system comprising the first playback device; and determining, based on the queried playback history data, that the particular audio content was being played back when the first event was detected, wherein the particular audio content is associated with a particular identifier identifying the network location at the one or more servers of the particular streaming audio service, wherein sending the instructions indicating the network location at the one or more servers of the particular streaming audio service comprises sending instructions indicating the particular identifier.

Example 3: The method of any of Examples 1 and 2, wherein the first domain comprises a wireless streaming protocol defining a sender and a receiver connected via a local area network (LAN), wherein the mobile device is configured as the sender to configure the first playback device as the receiver to stream the particular audio content from the network location at the one or more servers during the playback session in the first domain, and wherein the second domain comprises a native control protocol, and wherein sending the instructions to initiate the playback session in the second domain comprises a native control application executing on the mobile device sending instructions according to the native control protocol to (i) populate a queue associated with the second playback device with the particular audio content and (ii) start playback at the offset.

Example 4: The method of any of Examples 1-3, wherein the first domain comprises a wireless streaming protocol defining a sender and a receiver connected via a local area network (LAN), wherein the mobile device is configured as the sender to configure the first playback device as the receiver to stream the particular audio content from the network location at the one or more servers during the playback session in the first domain, and wherein the second domain comprises a native control protocol, and wherein sending the instructions to initiate the playback session in the second domain comprises: a native control application executing on the mobile device initiating the playback session in the second domain; and the native control application executing on the mobile device sending, via an 802.15-compatible network interface, a data stream representing the particular audio content, the data stream beginning at the offset in the particular audio content, wherein receiving the data stream causes the second playback device to begin playback of the particular audio content at the offset.

Example 5: The method of Example 4, wherein detecting the first event comprises detecting that the mobile device has left the proximity of the first playback device, wherein the second playback device comprises a car stereo receiver, and wherein the method further comprises: after detecting the first event, detecting a second event, the second event corresponding to a trigger to initiate the playback session in the second domain, wherein sending the instructions to initiate the playback session in the second domain comprises sending the instructions to initiate the playback session in the second domain in response to detecting the second event, and wherein detecting the second event comprises detecting that the mobile device has formed a 802.15 connection with the car stereo receiver.

Example 6: The method of Example 4, wherein detecting the first event comprises detecting that the mobile device has left the proximity of the first playback device, wherein the second playback device comprises 802.15-compatible headphones, and wherein the method further comprises: after detecting the first event, detecting a second event, the second event corresponding to a trigger to initiate the playback session in the second domain, wherein sending the instructions to initiate the playback session in the second domain comprises sending the initiate the playback session in the second domain in response to detecting the second event, and wherein detecting the second event comprises detecting that the mobile device has formed a 802.15 connection with the 802.15-compatible headphones.

Example 7: The method of any of Examples 1-6, wherein the first domain comprises a streaming audio service control protocol and a streaming audio service application, and wherein the streaming audio service application sent instructions according to the streaming audio service control protocol to initiate the first playback session in the first domain on the first playback device, and wherein sending the instructions to initiate the playback session in the second domain comprises a native control application executing on the mobile device sending instructions according to the native control protocol to (i) populate a queue associated with the second playback device with the particular audio content and (ii) start playback at the offset.

Example 8: The method of any of Examples 1-7, wherein the first domain comprises a wireless streaming protocol defining a sender device and a receiver device connected via a local area network (LAN), wherein the mobile device is configured as the sender to configure the first playback device as the receiver to stream the particular audio content from the network location at the one or more servers during the playback session in the first domain, and wherein the second domain comprises a streaming audio service control protocol and a streaming audio service application, and wherein sending the instructions to initiate the playback session in the second domain comprises the streaming audio service control application executing on the mobile device sending instructions according to the streaming audio service control protocol to the second playback device to play back the particular audio content starting at the offset.

Example 9: The method of any of Examples 1-8, wherein the first domain comprises a streaming audio service control protocol and a streaming audio service application associated with a particular user account of the streaming media service, and wherein the streaming audio service application sent instructions according to the streaming audio service control protocol to initiate the first playback session in the first domain on the first playback device, and wherein sending the instructions to initiate the playback session in the second domain comprises a native control application associated with a particular user account of a native cloud service executing on the mobile device sending, to one or more servers of the native cloud service, instructions according to the native control protocol (i) populate a cloud queue associated with the second playback device with the particular audio content and (ii) start playback on the second playback device at the offset.

Example 10: The method of any of Examples 1-9, wherein detecting the first event comprises detecting a proximity tap between the mobile device and the second playback device.

Example 11: The method of any of Examples 1-10, wherein sending the instructions to initiate the playback session in the second domain to play back the particular audio content on the second playback device comprises: sending, via a network interface to one or more cloud servers associated with the second domain, instructions to initiate the playback session in the second domain to play back the particular audio content on the second playback device.

Example 12: The method of any of Examples 1-11, wherein sending the instructions to initiate the playback session in the second domain to play back the particular audio content on the second playback device comprises: sending, via an inter-process communication interface to an application associated with the second domain, instructions to initiate the playback session in the second domain to play back the particular audio content on the second playback device.

Example 13: The method of any of Examples 1-12, wherein sending the instructions to initiate the playback session in the second domain to play back the particular audio content on the second playback device comprises: sending, via an inter-process communication interface to an application associated with the second domain, instructions to initiate the playback session in the second domain to play back the particular audio content on the second playback device.

Example 14: A tangible, non-transitory, computer-readable medium having instructions stored thereon that are executable by one or more processors to cause a mobile device to perform the method of any one of Examples 1-13.

Example 15: A mobile device comprising a network interface, one or more processors, and a data storage having instructions stored thereon executable by the one or more processors to cause the playback device to perform the method of any of Examples 1-13.

Example 16: A system configured to perform the method of any of Examples 1-13.

The invention claimed is:

1. A method to be performed by a mobile device, the method comprising:
   while a playback device is playing back audio content during a first playback session in a first domain, detecting an event, the event configured as a trigger to transfer playback to a second domain on the mobile device, wherein the first domain comprises a first protocol, and wherein the second domain comprises a second protocol;
   in response to detecting the event, determining that the playback device was playing particular audio content from a network location at one or more servers of a particular streaming audio service in the first playback session and that the playback device was at a given playback position in the particular audio content; and
   initiating a second playback session in the second domain to play back the particular audio content on the mobile device from the network location at the one or more servers of the particular streaming audio service and beginning at an offset in the particular audio content representing the given playback position such that the first playback session in the first domain is reproduced by the second playback session in the second domain.

2. The method of claim 1, wherein determining that the playback device was playing the particular audio content from one or more servers of the particular streaming audio service comprises:
   querying multiple streaming audio services for playback history data associated with respective user accounts of the multiple streaming audio services, wherein the user accounts of the multiple streaming audio services are registered with a media playback system comprising the playback device; and
   determining, based on the queried playback history data, that the particular audio content was being played back when the event was detected, wherein the particular audio content is associated with a particular identifier identifying the network location at the one or more servers of the particular streaming audio service, wherein initiating the second playback session in the second domain comprises sending instructions indicating the network location at the one or more servers of the particular streaming audio service via the particular identifier.

3. The method of claim 1, wherein the first protocol of the first domain comprises a wireless streaming protocol defining a sender and a receiver connected via a local area network (LAN), wherein the mobile device is configured as the sender to configure the playback device as the receiver to stream the particular audio content from the network location at the one or more servers during the first playback session in the first domain, and wherein the second protocol of the second domain comprises a streaming audio service control protocol, and wherein initiating the second playback session in the second domain comprises a streaming audio service application executing on the mobile device sending instructions according to the streaming audio service control protocol to (i) stream data representing the particular audio content and (ii) start playback at the offset.

4. The method of claim 1, wherein the first protocol of the first domain comprises a streaming audio service control protocol, and wherein the second protocol of the second domain comprises a wireless streaming protocol defining a sender and a receiver connected via a local area network (LAN), and wherein initiating the second playback session in the second domain comprises defining the mobile device as at least one of (a) the sender and (b) the receiver of the second playback session.

5. The method of claim 1, wherein the first protocol of the first domain comprises a native control protocol, and wherein the second protocol of the second domain comprises a wireless streaming protocol defining a sender and a receiver connected via a local area network (LAN), wherein the second domain comprises a streaming audio service control protocol, and wherein initiating the second playback session in the second domain comprises a streaming audio service application executing on the mobile device sending instructions according to the streaming audio service control protocol to (i) stream data representing the particular audio content and (ii) start playback at the offset.

6. The method of claim 1, wherein the first protocol of the first domain comprises a native control protocol, and wherein the second protocol of the second domain comprises a wireless streaming protocol defining a sender and a receiver connected via a local area network (LAN), and wherein initiating the second playback session in the second domain comprises defining the mobile device as at least one of (a) the sender and (b) the receiver of the second playback session.

7. The method of claim 1, wherein detecting the event comprises detecting that the mobile device has left proximity of the playback device, wherein the playback device comprises a car stereo receiver, and wherein the method further comprises:
   after detecting the event, detecting an additional event, the additional event corresponding to a trigger to initiate a third playback session in a third domain;
   determining that the playback device was playing the particular audio content from the network location at the one or more servers of the particular streaming audio service in the first playback session and that the playback device was at a subsequent playback position in the particular audio content; and
   after detecting the additional event, initiating the third playback session in the third domain to play back the particular audio content on an additional device from the network location at the one or more servers of the particular streaming audio service and beginning at an additional offset in the particular audio content representing the subsequent playback position.

8. The method of claim 1, wherein detecting the event comprises detecting a proximity tap between the mobile device and the playback device.

9. A tangible, non-transitory computer-readable medium having stored thereon instructions executable by at least one processor to cause a mobile device to perform functions comprising:
   while a playback device is playing back audio content during a first playback session in a first domain, detecting an event, the event configured as a trigger to transfer playback to a second domain on the mobile device, wherein the first domain comprises a first protocol, and wherein the second domain comprises a second protocol;

in response to detecting the event, determining that the playback device was playing particular audio content from a network location at one or more servers of a particular streaming audio service in the first playback session and that the playback device was at a given playback position in the particular audio content; and initiating a second playback session in the second domain to play back the particular audio content on the mobile device from the network location at the one or more servers of the particular streaming audio service and beginning at an offset in the particular audio content representing the given playback position such that the first playback session in the first domain is reproduced by the second playback session in the second domain.

10. The tangible, non-transitory computer-readable medium of claim 9, wherein determining that the playback device was playing the particular audio content from the one or more servers of the particular streaming audio service comprises:

querying multiple streaming audio services for playback history data associated with respective user accounts of the multiple streaming audio services, wherein the user accounts of the multiple streaming audio services are registered with a media playback system comprising the playback device; and determining, based on the queried playback history data, that the particular audio content was being played back when the event was detected, wherein the particular audio content is associated with a particular identifier identifying the network location at the one or more servers of the particular streaming audio service, wherein sending the instructions indicating the network location at the one or more servers of the particular streaming audio service comprises sending instructions indicating the particular identifier.

11. The tangible, non-transitory computer-readable medium of claim 9, wherein the first protocol of the first domain comprises a wireless streaming protocol defining a sender and a receiver connected via a local area network (LAN), wherein the mobile device is configured as the sender to configure the playback device as the receiver to stream the particular audio content from the network location at the one or more servers during the first playback session in the first domain, and wherein the second protocol of the second domain comprises a streaming audio service control protocol, and wherein initiating the second playback session in the second domain comprises a streaming audio service application executing on the mobile device sending instructions according to the streaming audio service control protocol to (i) stream data representing the particular audio content and (ii) start playback at the offset.

12. The tangible, non-transitory computer-readable medium of claim 9, wherein the first protocol of the first domain comprises a streaming audio service control protocol, and wherein the second protocol of the second domain comprises a wireless streaming protocol defining a sender and a receiver connected via a local area network (LAN), and wherein initiating the second playback session in the second domain comprises defining the mobile device as at least one of (a) the sender and (b) the receiver of the second playback session.

13. The tangible, non-transitory computer-readable medium of claim 9, wherein the first protocol of the first domain comprises a native control protocol, and wherein the second domain comprises a wireless streaming protocol defining a sender and a receiver connected via a local area network (LAN), wherein the second protocol of the second domain comprises a streaming audio service control protocol, and wherein initiating the second playback session in the second domain comprises a streaming audio service application executing on the mobile device sending instructions according to the streaming audio service control protocol to (i) stream data representing the particular audio content and (ii) start playback at the offset.

14. The tangible, non-transitory computer-readable medium of claim 9, wherein the first domain comprises a native control protocol, and wherein the second domain comprises a wireless streaming protocol defining a sender and a receiver connected via a local area network (LAN), and wherein initiating the second playback session in the second domain comprises defining the mobile device as at least one of (a) the sender and (b) the receiver of the second playback session.

15. The tangible, non-transitory computer-readable medium of claim 9, wherein detecting the event comprises detecting that the mobile device has left proximity of the playback device, wherein the playback device comprises a car stereo receiver, and wherein the functions further comprises:

after detecting the event, detecting an additional event, the additional event corresponding to a trigger to initiate a third playback session in a third domain;

determining that the playback device was playing the particular audio content from the network location at the one or more servers of the particular streaming audio service in the first playback session and that the playback device was at a subsequent playback position in the particular audio content; and after detecting the additional event, initiating the third playback session in the third domain to play back the particular audio content on an additional device from the network location at the one or more servers of the particular streaming audio service and beginning at an additional offset in the particular audio content representing the subsequent playback position.

16. The tangible, non-transitory computer-readable medium of claim 9, wherein detecting the event comprises detecting a proximity tap between the mobile device and the playback device.

17. A system comprising a mobile device and a playback device, the system configured to perform functions comprising:

while the playback device is playing back audio content during a first playback session in a first domain, detecting an event, the event configured as a trigger to transfer playback to a second domain on the mobile device, wherein the first domain comprises a first protocol, and wherein the second domain comprises a second protocol;

in response to detecting the event, determining that the playback device was playing particular audio content from a network location at one or more servers of a particular streaming audio service in the first playback session and that the playback device was at a given playback position in the particular audio content; and initiating a second playback session in the second domain to play back the particular audio content on the mobile device from the network location at the one or more servers of the particular streaming audio service and beginning at an offset in the particular audio content representing the given playback position such that the first playback session in the first domain is reproduced by the second playback session in the second domain.

18. The system of claim 17, wherein the first protocol of the first domain comprises a wireless streaming protocol defining a sender and a receiver connected via a local area network (LAN), wherein the mobile device is configured as the sender to configure the playback device as the receiver to stream the particular audio content from the network location at the one or more servers during the first playback session in the first domain, and wherein the second protocol of the second domain comprises a streaming audio service control protocol, and wherein initiating the second playback session in the second domain comprises a streaming audio service application executing on the mobile device sending instructions according to the streaming audio service control protocol to (i) stream data representing the particular audio content and (ii) start playback at the offset.

19. The system of claim 17, wherein the first protocol of the first domain comprises a native control protocol, and wherein the second protocol of the second domain comprises a wireless streaming protocol defining a sender and a receiver connected via a local area network (LAN), wherein the second domain comprises a streaming audio service control protocol, and wherein initiating the second playback session in the second domain comprises a streaming audio service application executing on the mobile device sending instructions according to the streaming audio service control protocol to (i) stream data representing the particular audio content and (ii) start playback at the offset.

20. The system of claim 17, wherein the first protocol of the first domain comprises a native control protocol, and wherein the second protocol of the second domain comprises a wireless streaming protocol defining a sender and a receiver connected via a local area network (LAN), and wherein initiating the second playback session in the second domain comprises defining the mobile device as at least one of (a) the sender and (b) the receiver of the second playback session.

* * * * *

UNITED STATES PATENT AND TRADEMARK OFFICE
CERTIFICATE OF CORRECTION

PATENT NO. : 11,740,857 B2
APPLICATION NO. : 17/524579
DATED : August 29, 2023
INVENTOR(S) : Dinesh Kannan It is certified that error appears in the above-identified patent and that said Letters Patent is hereby corrected as shown below:

In the Claims

In Column 41, in Claim 2, Line 41, delete "from one" and insert -- from the one --, therefor.

Signed and Sealed this
Third Day of October, 2023

Katherine Kelly Vidal
*Director of the United States Patent and Trademark Office*